US012770593B2

(12) United States Patent
Maezawa et al.

(10) Patent No.: US 12,770,593 B2
(45) Date of Patent: Oct. 20, 2026

(54) MUSICAL PERFORMANCE EVALUATION SYSTEM, MUSICAL PERFORMANCE EVALUATION METHOD AND NON-TRANSITORY COMPUTER-READABLE MEDIUM STORING MUSICAL PERFORMANCE EVALUATION PROGRAM

(71) Applicant: Yamaha Corporation, Hamamatsu (JP)

(72) Inventors: Akira Maezawa, Hamamatsu (JP); Alia Morsi, Barcelona (ES)

(73) Assignee: YAMAHA CORPORATION, Shizuoka (JP)

( * ) Notice: Subject to any disclaimer, the term of this patent is extended or adjusted under 35 U.S.C. 154(b) by 590 days.

(21) Appl. No.: 18/348,827

(22) Filed: Jul. 7, 2023

(65) Prior Publication Data

US 2025/0014542 A1 Jan. 9, 2025

(51) Int. Cl.
*G10H 1/00* (2006.01)

(52) U.S. Cl.
CPC ..... *G10H 1/0008* (2013.01); *G10H 2210/091* (2013.01)

(58) Field of Classification Search
CPC .......................... G10H 1/008; G10H 2210/091
See application file for complete search history.

(56) References Cited

U.S. PATENT DOCUMENTS

| | | | | |
|---|---|---|---|---|
| 7,164,076 | B2 * | 1/2007 | McHale | G10H 3/125 84/645 |
| 8,629,342 | B2 * | 1/2014 | Lee | G10H 3/186 84/610 |
| 8,785,757 | B2 * | 7/2014 | Pillhofer | G09B 15/002 84/470 R |
| 8,957,296 | B2 * | 2/2015 | Helms | G10H 1/0016 84/669 |
| 9,087,500 | B2 * | 7/2015 | Sumi | G10H 7/00 |
| 9,333,418 | B2 * | 5/2016 | Lee | G10H 1/0016 |
| 9,336,766 | B2 * | 5/2016 | Matsumoto | G10H 1/0066 |
| 9,697,739 | B1 * | 7/2017 | Goncalves | G10H 1/0008 |
| 10,115,380 | B1 * | 10/2018 | Dick | G10H 1/0008 |

(Continued)

OTHER PUBLICATIONS

B. Gingras, C. Palmer, P. N. Schubert, and S. McAdams, "Influence of melodic emphasis, texture, salience, and performer individuality on performance errors," Psychology of Music, vol. 44, p. 847-863, published 2016.

(Continued)

*Primary Examiner* — Christina M Schreiber
(74) *Attorney, Agent, or Firm* — Spencer Fane LLP

(57) ABSTRACT

A musical performance evaluation system basically includes an audio input, a notification device and at least one processor. The audio input is configured to input a musical performance. The notification device outputs an evaluation of the musical performance received via the audio input. The at least one processor executes a musical performance evaluation program to identify errors in the musical performance based on reference data of segments of musical performances containing errors, classify the errors in the musical performance as either a conspicuous error or an inconspicuous error, and instruct the notification device to output the evaluation of the musical performance identifying a presence of conspicuous errors differently from inconspicuous errors.

20 Claims, 17 Drawing Sheets

(56) References Cited

U.S. PATENT DOCUMENTS

| | | | | |
|---|---|---|---|---|
| 10,176,791 B2* | 1/2019 | Jeon | G10H 3/146 | |
| 11,348,561 B2* | 5/2022 | Maezawa | G10H 1/0008 | |
| 12,243,437 B2* | 3/2025 | Aharonson | G10H 1/0008 | |
| 12,254,548 B1* | 3/2025 | Datta | G06T 13/205 | |
| 2007/0163428 A1* | 7/2007 | Salter | G10H 1/0058 | 84/611 |
| 2009/0255396 A1* | 10/2009 | Flamini | G10L 15/26 | 84/477 R |
| 2011/0259176 A1* | 10/2011 | Pillhofer | G09B 15/002 | 84/470 R |
| 2014/0305287 A1* | 10/2014 | Sasaki | G10H 1/0066 | 84/609 |
| 2015/0000505 A1* | 1/2015 | Penttinen | G10H 7/002 | 84/609 |
| 2015/0172444 A1* | 6/2015 | Naftolin | G06F 9/448 | 455/418 |
| 2015/0317911 A1* | 11/2015 | Kawabata | G10G 1/00 | 84/470 R |
| 2020/0193948 A1* | 6/2020 | Maezawa | G06F 9/542 | |
| 2022/0180767 A1* | 6/2022 | Aharonson | G10G 3/04 | |
| 2023/0060290 A1* | 3/2023 | Minamitaka | G10H 1/0008 | |
| 2023/0252908 A2* | 8/2023 | Aharonson | G09B 15/00 | 84/470 R |
| 2023/0274658 A2* | 8/2023 | Aharonson | G10G 1/04 | 84/470 R |
| 2024/0274022 A1* | 8/2024 | Binienda | G09B 5/02 | |
| 2025/0014542 A1* | 1/2025 | Maezawa | G10H 1/0008 | |
| 2025/0363911 A1* | 11/2025 | Zewi | G09B 15/00 | |
| 2026/0112343 A1* | 4/2026 | Maezawa | G10H 1/0008 | |

OTHER PUBLICATIONS

M. E. P. Davies and S. Böck, "Temporal convolutional networks for musical audio beat tracking," in Proc. European Signal Processing Conference (EUSIPCO), published Sep. 2019.

E. Nakamura, K. Yoshi, and H. Katayose, "Performance error detection and post-processing for fast and accurate symbolic music alignment," in Proc. International Society for Music Information Retrieval Conference (ISMIR), pp. 347-353, published Oct. 2017.

J. Huang, Y. N. Hung, K. A. Pati, S. Gururani, and A. Lerch, "Score-informed networks for music performance assessment," in Proc. International Society for Music Information Retrieval Conference (ISMIR), published 2020.

H. Zhang and Y. a. Jiang, "Learn by referencing: Towards deep metric learning for singing assessment," in Proc. International Society for Music Information Retrieval Conference (ISMIR), published 2021.

E. Benetos, A. Klapuri, and S. Dixon, "Score-informed transcription for automatic piano tutoring," in Proc. European Signal Processing Conference (EUSIPCO) pp. 2153-2157, published 2012.

T. Nakano, M. Goto, and Y. Hiraga, "An automatic singing skill evaluation method for unknown melodies using pitch interval accuracy and vibrato features," in Proc. International Conference on Spoken Language Processing (ICSLP), p. 1706-1709, published Sep. 2006.

C. W. Wu, S. Gururani, C. Laguna, A. Pati, A. Vidwans, and A. Lerch, "Towards the objective assessment of music performances," in Proc. International Conference on Music Perception and Cognition (ICMPC), published Jul. 2016.

K. A. Pati, S. Gururani, and A. Lerch, "Assessment of student music performances using deep neural hetworks," Journal of Applied Sciences, vol. 8, No. 4. [Online]. Available: https://www.mdpi.com/2076-3417/8/4/507, published 2018.

J. Abeßer, J. Hasselhorn, S. Grollmisch, C. Dittmar, and A. Lehmann, "Automatic competency assessment of rhythm performances of ninth-grade and tenth-grade pupils," in Joint Proc. International Computer Music Conference (ICMC), and Sound and Music Computing Conference (SMC), pp. 1252-1256, published Sep. 2014.

T. Knight, F. Uphamm, and I. Fujinaga, "The potential for automatic assessment of trumpet tone quality," in Proc. International Society for Music Information Retrieval Conference (ISMIR), published 2011.

P. Seshadri and A. Lerch, "Improving music performance assessment with contrastive learning," in Proc. International Society for Music Information Retrieval Conference (ISMIR), published Nov. 2021.

T. Fukuda, Y. Ikemiya, K. Itoyama, and K. Yoshii, "A score-informed piano tutoring system with mistake detection and score simplification." Proc. Sound and Music Computing Conference (SMC), published Jul. 2015.

V. Phanichraksaphong and W.-H. Tsai, "Automatic evaluation of piano performances for steam education," Applied Sciences, vol. 11, No. 24. [Online]. Available: https://www.mdpi.com/2076-3417/11/24/11783, published 2021.

J. Abeßer, J. Hasselhorn, S. Grollmisch, C. Dittmar, and A. Lehmann, "Automatic quality assessment of vocal and instrumental performances of ninth-grade and tenth-grade pupils," in Proc. International Symposium on Computer Music Multidisciplinary Research (CMMR), published 2013.

J. Pan, M. Li, Z. Song, X. Li, X. Liu, H. Yi, and M. Zhu, "An Audio Based Piano Performance Evaluation Method Using Deep Neural Network Based Acoustic Modeling," Interspeech, published 2017.

C. E. Cancino-Chacón, S. D. Peter, E. Karystinaios, F. Foscarin, M. Grachten, and G. Widmer, "Partitura: A Python Package for Symbolic Music Processing," in Proc. Music Encoding Conference (MEC2022), published 2022.

Y. Morijiri, S. Obata, A. Maezawa, and T. Fujishima, "Understanding the challenges for adult beginners at piano practice from an analysis of errors," in Proc. Asia-Pacific Symposium for Music Education Research (APSMER2021), published 2021.

C. Raffel, B. McFee, E. J. Humphrey, J. Salamon, O. Nieto, D. Liang, and D. P. W. Ellis, "Mir_Eval: A Transparent Implementation of Common MIR Metrics," in Proc. International Society for Music Information Retrieval Conference (ISMIR), pp. 367-372. [Online]. Available: http://dblp.uni-trier.de/db/conf/ismir/ismir2014.html#RaffelMHSNLE14, published 2014.

A. Acquilino and G. Scavone, "Current state and future directions of technologies for music instrument pedagogy," Frontiers in Psychology, vol. 13:835609, published 2022.

V. Eremenko, A. Morsi, J. Narang, and X. Serra, "Performance assessment technologies for the support of musical instrument learning," in Proc. International Conference on Computer Supported Education (CSEDU), pp. 629-640, published May 2020.

A. Fernandez, "Onsets and Velocities: Affordable Real-Time Piano Transcription Using Convolutional Neural Networks", representaarXiv: 2303.04485v2 [cs.SD], published Jun. 1, 2023.

* cited by examiner

D – Abrupt Pause or Repetition

Recording Screen

Recording Screen

MUSICAL PERFORMANCE EVALUATION SYSTEM, MUSICAL PERFORMANCE EVALUATION METHOD AND NON-TRANSITORY COMPUTER-READABLE MEDIUM STORING MUSICAL PERFORMANCE EVALUATION PROGRAM

BACKGROUND

Technical Field

The present disclosure generally relates to a musical performance evaluation system, a performance evaluation method, and a non-transitory computer-readable medium storing musical performance evaluation program. More specifically, the present disclosure relates to providing feedback on the presence of errors in a musical performance.

Background Information

A commonly held notion in automatic music performance analysis (MPA) research is that deviations of music performances from their underlying music score can be regarded as performance errors. However, some music pedagogy research suggests that some of deviations of music performances are more apparent to a listener than others. For example, a chord that is voiced differently from that written in the score might be overlooked, but missing a note in a characteristic motif, or playing a note that clashes with the underlying harmony would stand out. Thus, some of the errors in music performances are more noticeable than other errors in music performances.

In recent years, the music industry has developed various computer aided devices intended to teach and/or improve a student's ability to play an instrument such as the piano. For example, various instrument teaching software and apps have been developed to teach and/or improve a student's ability to play a musical instrument. These teaching software and apps do not distinguish between the different types of errors in music performances. Rather, all errors in music performances are treated in the same manner.

SUMMARY

The music education software which provides analysis solely founded on rigid note level rhythmic and pitch correctness has been challenged on the basis that users might end up too focused on playing too correctly (almost robotically) to attain the highest scores. It has been discovered that there are many considerations for designing useful music education software that automatic assess a musical performance. For example, it has been discovered that beginning and intermediate students need feedback on their performances differently from advanced students. The present disclosure is basically directed to a musical performance evaluation system which provides feedback to beginning and intermediate students on their performances. In particular, in musical performances, some mistakes or errors may stand out to listeners, whereas other mistakes may go unnoticed. How noticeable the errors depends on factors including the contextual appropriateness of the errors and a listener's degree of familiarity with the musical performance that is being performed. A conspicuous error or mistake is considered to be an error or mistake where there is something obviously wrong with the performance to a listener regardless of the listener's degree of knowledge of the musical performance that is being performed. More specifically, a conspicuous error is considered to be a performance error that can be detected by the majority of listeners with a formal music training, regardless of their degree of knowledge about the underlying music score of a performed piece. Of course, conspicuous errors are dependent on the listener's knowledge of the piece and the proficiency of the performer. Furthermore, conspicuous error and expression are two sides of the same coin. For example, hitting an adjacent key can either come across as an expressive ornament or a conspicuous error. This suggests that conspicuous error detection should inherently be conditioned on the style, the level of the listener, and the player's proficiency.

One aspect of the present disclosure is to infer a time sequence of binary labels for evaluating a musical performance by indicating the presence of conspicuous errors at a given time for a given a sequence of music.

Another aspect of the present disclosure is to provide a musical performance evaluation system having a score independent conspicuous error detector to aid beginner to intermediate students by evaluating their musical performances.

In accordance with one aspect of the present disclosure, a musical performance evaluation system is provided that basically comprises an audio input, a notification device and at least one processor. The audio input is configured to input a musical performance. The notification device is configured to output an evaluation of the musical performance. The at least one processor is operatively coupled with the computer-readable storage medium and the notification device. The at least one processor is configured to execute a musical performance evaluation program to identify errors in the musical performance based on the reference data of segments of musical performances containing errors, classify the errors in the musical performance as either a conspicuous error or an inconspicuous error, and instruct the notification device to output the evaluation of the musical performance identifying a presence of conspicuous errors differently from inconspicuous errors.

In accordance with another aspect of the present disclosure, a computer-implemented musical performance evaluation method is provided to an evaluation of a musical performance. The computer-implemented musical performance evaluation method comprises acquiring a musical performance played by a user; identifying errors in the musical performance based on reference data of segments of musical performances containing errors using at least one processor; classifying the errors in the musical performance as either a conspicuous error or an inconspicuous error using the at least one processor; and instructing a notification device to output an evaluation of the musical performance by identifying a presence of conspicuous errors differently from inconspicuous errors.

In accordance with another aspect of the present disclosure, a non-transitory computer-readable medium is provided that stores a musical performance evaluation program, which when executed by a computing device causes the computing device to perform operations comprising: acquiring a musical performance of an instrument played by a user; identifying errors in the musical performance based on reference data of segments of musical performances containing errors using at least one processor of the computing device; classifying the errors in the musical performance as either a conspicuous error or an inconspicuous error using the at least one processor of the computing device; and instructing a notification device to output an evaluation of the musical performance by identifying a presence of conspicuous errors differently from inconspicuous errors.

Also, other objects, features, aspects and advantages of the disclosed musical performance evaluation system will become apparent to those skilled in the art from the following detailed description, which, taken in conjunction with the annexed drawings, discloses preferred embodiments of the musical performance evaluation system.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the musical field from this disclosure that the following descriptions of the embodiments are provided for illustration only and not for the purpose of limiting the invention as defined by the appended claims and their equivalents.

Figure 1:
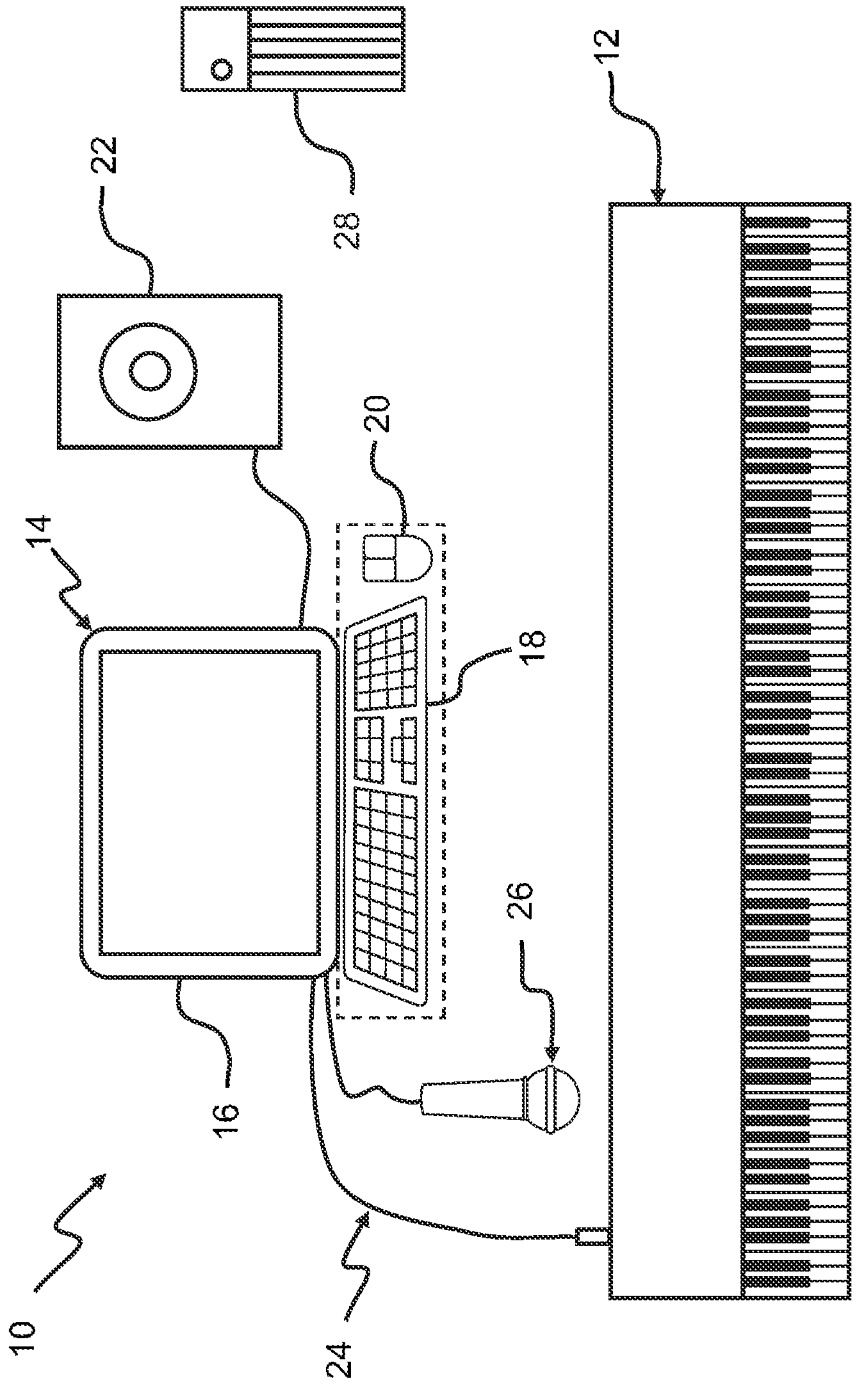
FIG. 1 is a simplified diagrammatic view of a musical performance evaluation system in accordance with one embodiment where the musical instrument is an electric keyboard.

Referring initially to FIG. 1, a musical performance evaluation system 10 is illustrated that is equipped with a musical performance evaluation program in accordance with one exemplary embodiment. In exemplary embodiment of FIG. 1, the musical performance evaluation system 10 is used with a digital piano 12 to acquire musical performance played on the digital piano 12. In other words, in exemplary embodiment of FIG. 1, the digital piano 12 is one example of an instrument that is used with the musical performance evaluation system 10. It will be apparent from this disclosure that the musical performance evaluation system 10 can be used with other types of instruments or other devices that music may be performed on such as a laptop, a personal computer or a tablet.

Basically, as explained below in more detail, the musical performance evaluation system 10 illustrated in FIG. 1 is configured to provide feedback on a musical performance played on a musical instrument such as the digital piano 12 by a user or student. The musical performance evaluation system 10 is particularly useful for beginning and intermediate users. The musical performance evaluation system 10 is configured to focus on obvious errors or mistakes made by a performer in playing a musical performance. The musical performance evaluation system 10 is preferably configured to evaluate a musical performance without having the sheet music for the musical performance preloaded in the musical performance evaluation system 10. However, as explained below, the musical performance evaluation system 10 is not limited to this preferred methodology. Rather, the evaluation of the musical performance can be accomplished by comparing the musical performance to the sheet music for the musical performance that was preloaded in the musical performance evaluation system 10.

Also, in exemplary embodiment of FIG. 1, the musical performance evaluation system 10 includes a computing device 14. In exemplary embodiment of FIG. 1, the computing device 14 is a laptop computer having a display 16, a keyboard 18 and a mouse 20. The display 16 includes a liquid-crystal display, for example, and displays the results of the evaluation process conducted by the musical performance evaluation system 10. The display 16 is an example of a notification device of the musical performance evaluation system 10. The keyboard 18 and the mouse 20 are examples of input devices for the computing device 14. The keyboard 18 and the mouse 20 are operated by a user in order to make prescribed selections or designations. While the computing device 14 is illustrated as a laptop computer, the computing device 14 is not limited to a laptop computer as illustrated in FIG. 1. For example, the computing device 14 includes a personal computer, a tablet computer, a hand-held computer, a personal digital assistant (PDA), and a smartphone. Also, the display 16, the keyboard 18 and the mouse 20 can be replaced with a touch screen. In any case, the parts of the computing device 14 can be integrated into a single unit, or can be split into two or more separate and distinct units as is well known in the computing field.

Here, in exemplary embodiment of FIG. 1, the musical performance evaluation system 10 includes an external speaker 22. The external speaker 22 is another example of a notification device of the musical performance evaluation system 10. Alternatively, an internal speaker can be used to output a notification indicative of the results of the evaluation process conducted by the musical performance evaluation system 10. Of course, the notification device of the musical performance evaluation system 10 is not limited to the illustrated examples. The notification device of the musical performance evaluation system 10 can be any device that produces at least one of a visual notification, a haptic notification and an audio notification for notifying a user of the results of the evaluation process conducted by the musical performance evaluation system 10.

Here, in exemplary embodiment of FIG. 1, the musical performance evaluation system 10 is configured to acquire a musical performance of a musical instrument (e.g., the digital piano 12) played by a user. For example, the musical performance evaluation system 10 includes a communication cable 24 that connects the computing device 14 to the digital piano 12 or other musical instrument. Alternatively, for example, the musical performance evaluation system 10 includes a microphone 26 that is connected to the computing device 14 for acquiring a musical performance to the digital piano 12 or other musical instrument. The communication cable 24 (digital connection) and the microphone 26 are examples of an audio input that is configured to input a musical performance played on a musical instrument to the computing device 14. Of course, the audio input can be formed by other sound processing devices as needed and/or desired. In other words, the musical performance evaluation system 10 includes an audio input that is configured to input a musical performance played on a musical instrument to the computing device 14. Also, in the exemplary embodiment of FIG. 1, the musical performance evaluation system 10 can communicate with a remote server 28 (e.g., a network server or a cloud server). The remote server 28 includes at least one processor and a computer-readable storage device (i.e., computer memory).

Figure 2:
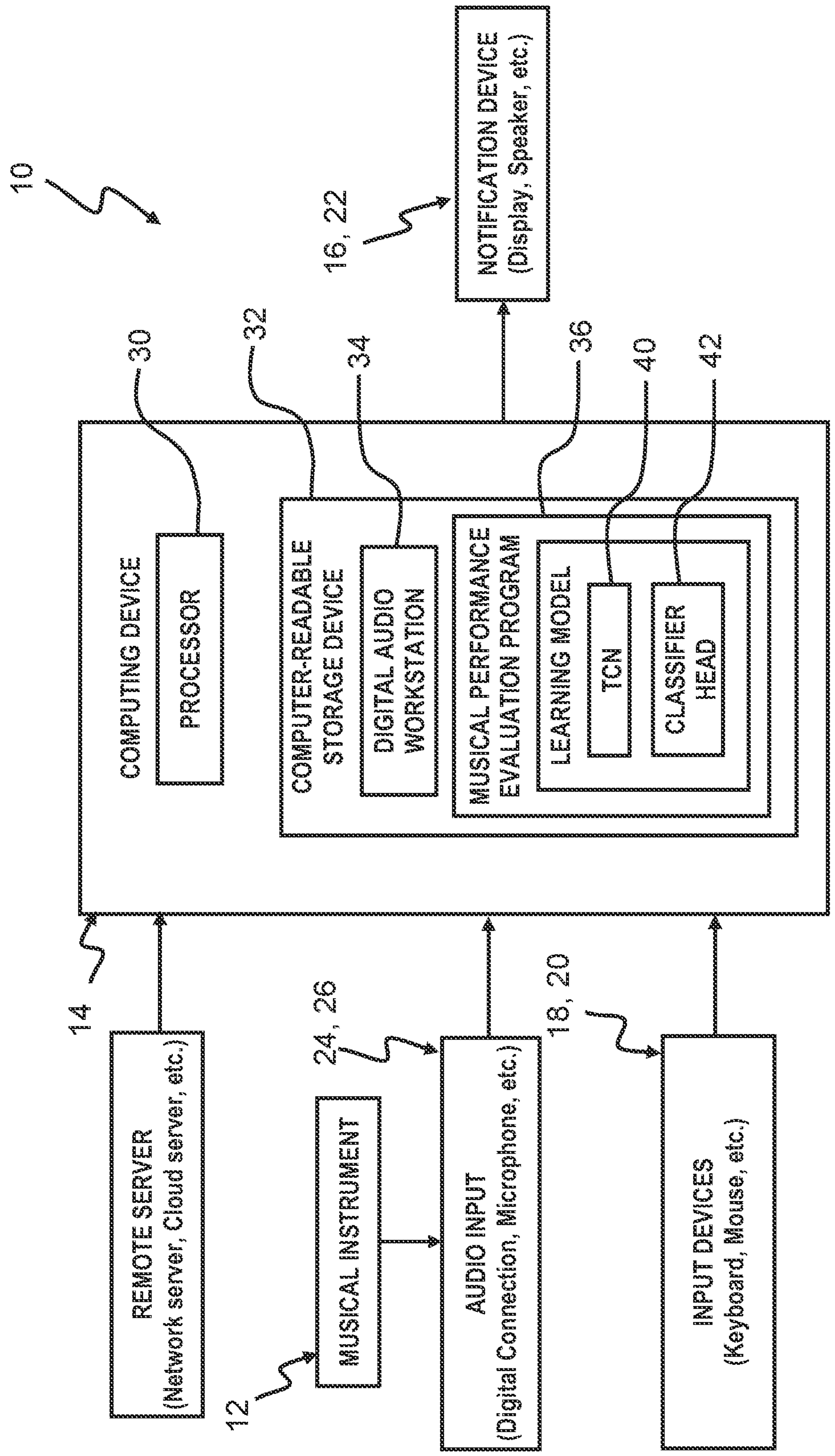
FIG. 2 is a block diagram of a musical performance evaluation system in accordance with one embodiment.

Referring to FIG. 2, a block diagram showing an example of an overall hardware setup for the musical performance evaluation system 10 of FIG. 1. As seen in FIG. 2, the computing device 14 includes at least one processor 30 and a computer-readable storage device 32 (i.e., computer memory). The processor 30 is configured to execute programs stored in the remote server 28 e.g., a network server or a cloud server) or the computer-readable storage device 32. The computing device 14 can include, instead of the processor 30 or in addition to the processor 30, one or more types of processors, such as a GPU (Graphics Processing Unit), a DSP (Digital Signal Processor), an FPGA (Field Programmable Gate Array), an ASIC (Application Specific Integrated Circuit), and the like.

The term "processor" as used herein refers to hardware that executes a software program, and does not include a human being. The term "computer-readable storage medium" as used herein refers to any non-transitory computer storage device and does not include a transitory propagating signal. For example, the computer-readable storage device 32 includes a storage medium such as a hard disk, an optical disk, a magnetic disk, or a memory card, and stores a learning model as described below.

Preferably, the computer-readable storage device 32 includes RAM (Random Access Memory) and ROM (Read Only Memory). The RAM of the computer-readable storage device 32 is a volatile memory that is used as work area for the processor 30 and temporarily storing various data. The ROM is a non-volatile memory that stores various support programs.

The processor 30 and the computer-readable storage device 32 are formed of one or more semiconductor chips that are mounted on a circuit board. The processor 30 is electrically connected to the computer-readable storage device 32. The processor 30 is also operatively coupled with the display 16 (i.e., the notification device), the keyboard 18, the mouse 20, the external speaker 22 (i.e., the notification device), the communication cable 24 (i.e., the audio input) and the microphone 26 (i.e., the audio input).

The processor 30 implements various functions by executing various functions stored in the computer-readable storage device 32. In the illustrated example of FIG. 2, the program execution by the processor 30 includes execution of the application program implementing a digital audio workstation (DAW) 34 and execution of a musical performance evaluation program 36. The processor 30 also executes an operating system and other subroutine programs, which are executed in response to user's instructions. The musical performance evaluation program 36 to be executed by the processor 30 can be recorded on a non-transitory computer readable recording medium, such as a magnetic recording medium (magnetic tape and a magnetic disk, for example), an optical recording medium (an optical disc, for example), a magneto-optical recording medium, and a semiconductor memory. The non-transitory computer readable recording medium can be provided to the computing device 14 and stored in the computer-readable storage device 32 of the computing device 14.

The digital audio workstation 34 is a software program stored in the computer-readable storage device 32. Alternatively, the digital audio workstation 34 can be stored in the computer-readable storage device of the remote server 28 (e.g., a network server or a cloud server). The digital audio workstation 34 is typically configured to compose, produce, record, mix and edit audio and MIDI data. The digital audio workstation 34 can be any commercially available software or a proprietary software so long as the software can at least record a musical performance played on a musical instrument that is to be evaluated. Since digital audio workstations are well known, the digital audio workstation 34 will not be discussed in further detail herein. In any case, the digital audio workstation 34 is configured to record the musical performance and provide MIDI note events of the musical performance as an input to the at least one processor 30.

Preferably, the MIDI note events of the musical performance includes a start time, an end time, a pitch and a velocity for each of the note events of the musical performance. Here, the digital audio workstation 34 creates at least one piano roll of the musical performance as the input to the at least one processor 30. Preferably as described below, the at least one piano roll of the musical performance includes a first piano roll providing data on note onsets of the musical performance and a second piano roll providing data on sustained portions due to key depression of the musical performance.

Figure 3:
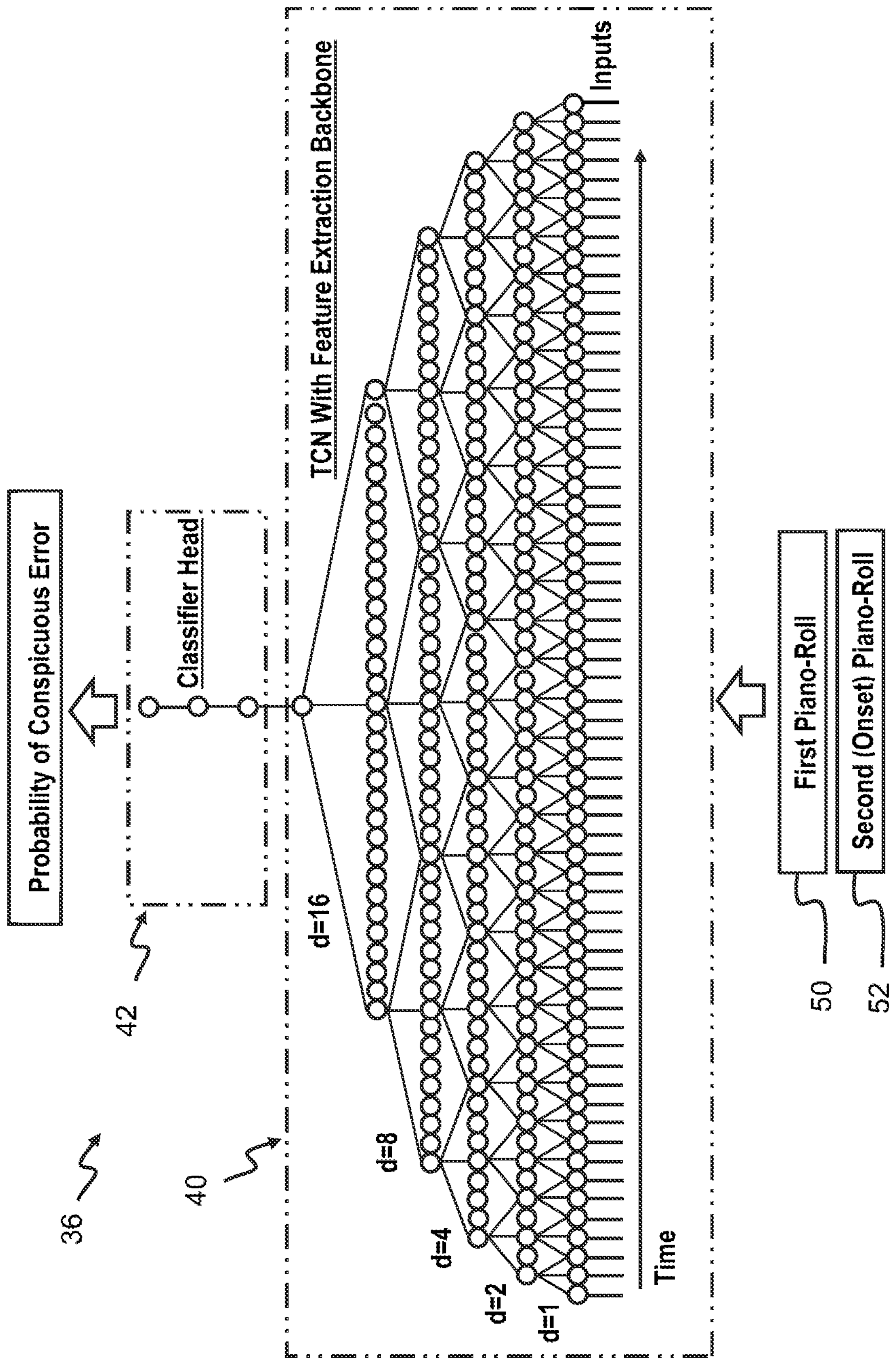
FIG. 3 is an illustration of a temporal convolutional network (TCN) having a feature extraction backbone and a classifier head that receives and evaluates a musical performance to identify conspicuous errors in the musical performance.
Figure 4:
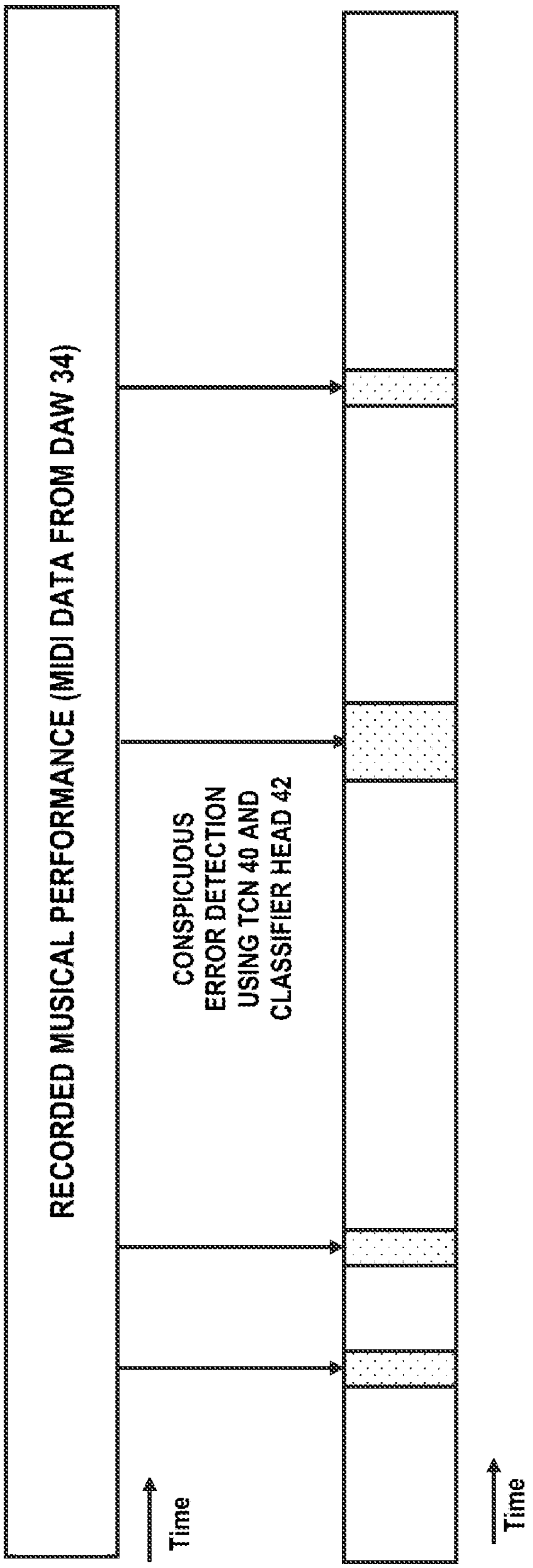
FIG. 4 is a simplified diagrammatic illustration of the musical performance evaluation system.
Figure 5:
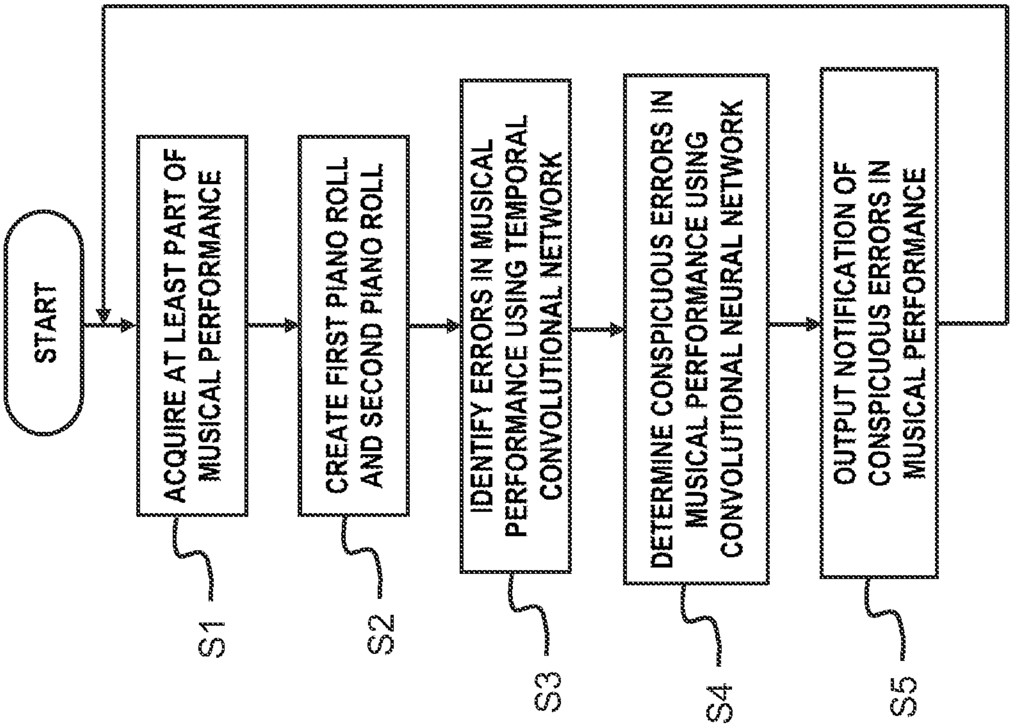
FIG. 5 is a flowchart illustrating an evaluation process executed by a computing device of the musical performance evaluation system.
Figure 6:
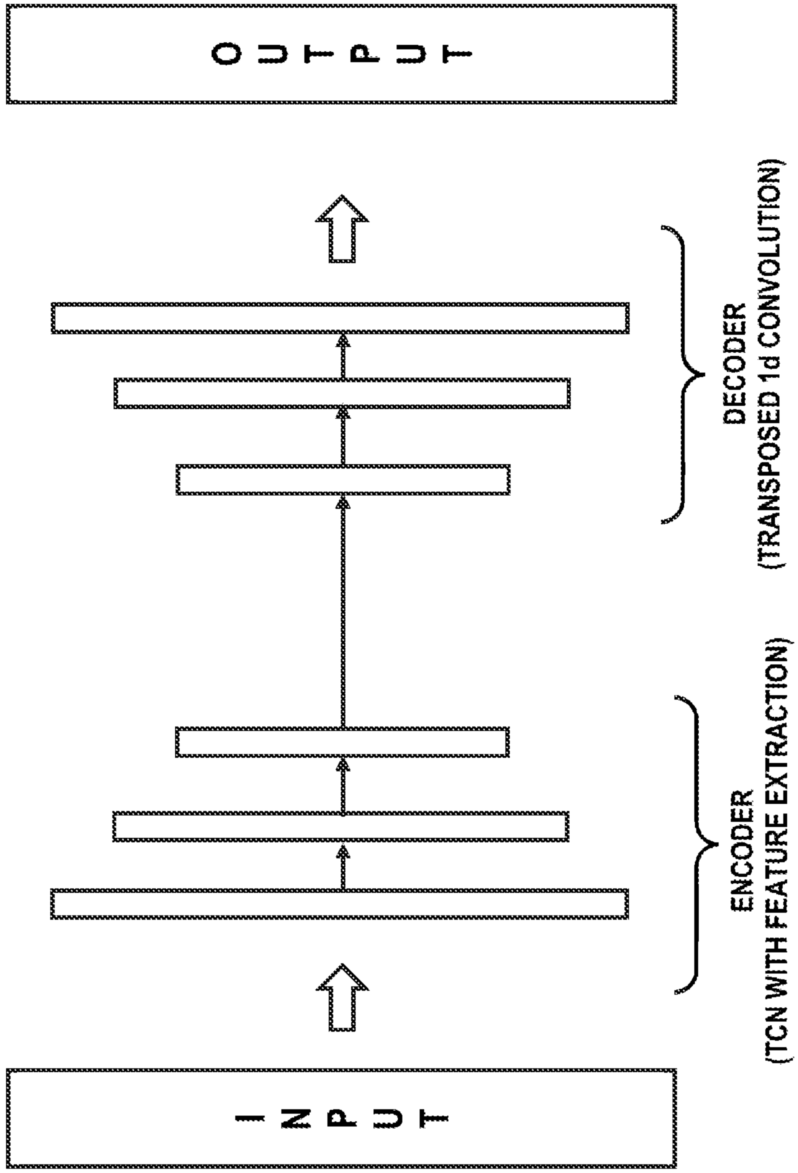
FIG. 6 is a diagrammatic illustration of an autoencoder used for training the feature extractor of the temporal convolutional network (TCN) using reference data of musical performances.

Referring now to FIGS. 3 to 5, the musical performance evaluation program 36 will now be discussed in more detail. The musical performance evaluation program 36 is a software program stored in the computer-readable storage device 32. Alternatively, the musical performance evaluation program 36 can be stored in the computer-readable storage device of the remote server 28 (e.g., a network server or a cloud server). The at least one processor 30 is configured to execute a musical performance evaluation program to classify the errors in the musical performance using a learning model of the musical performance evaluation program 36. The musical performance evaluation program 36 basically includes a temporal convolutional network 40 and a classifier head 42. The classifier head 42 is provided after the temporal convolutional network 42. Thus, the musical performance evaluation program 36 is a TCN-based network. The temporal convolutional network 40 and the classifier head 42 form a machine learning model, which can be simply referred to as a learning model. Here, the temporal convolutional network 40 receives a musical performance (e.g., at least one piano roll as input) and emits a binary label of conspicuous error at each prescribed time frame of the piano roll. Preferably, a binary label is assigned at frame-level instead of a note-level because not only the note itself but also an absence of a note can also indicate error in the musical performance. The temporal convolutional network 40 and the classifier head 42 can also be referred to as conspicuous error detector.

If the musical performance evaluation system 10 is connected to a network such as the Internet, the learning model can be stored in the server 28 (e.g., a network server or a cloud server) instead of the computer-readable storage device 32. As explained below in more detail, the musical performance evaluation program 36 is preferably a score independent evaluation program. However, the musical performance evaluation program 36 is not limited to a score independent evaluation program as mentioned below.

Basically, in the musical performance evaluation system 10, the musical performance is evaluated by comparing the musical performance against reference data that is stored in the computer-readable storage device 32 or the remote server 28 (e.g., a network server or a cloud server). The reference data is collected to identify errors or mistakes that were made by performers playing musical performances. In the main embodiment, the reference data does not include complete musical scores of musical performances that are error free (i.e., sheet music of musical performances). Rather, in the main embodiment, the reference data comprises a plurality of inaccurate musical performances having errors wherein the errors in the inaccurate musical performances have been identified. For example, in the case where the musical instrument is a piano, the reference data can be obtained by acquiring MIDI data of a plurality of actual piano performances performed by pianists of a variety of skill levels, and/or by creating synthetic data of a plurality of piano performances with procedurally generated mistakes. In either case, the errors or mistakes in the musical performances of the MIDI data and/or synthetic data are identified and classified. In particular, the reference data was annotated at the regions considered to contain one or more conspicuous errors. Thus, the term "reference data" as used herein refers to a set of data representing a plurality of segments of musical performances that includes annotation at the regions considered to contain one or more conspicuous errors.

Basically, in the musical performance evaluation system 10, the computer-readable storage medium 32 has reference data of segments of musical performances containing errors. Alternatively, the reference data of segments of musical performances containing errors can be stored on the remote server 28 (e.g., a network server or a cloud server). The notification device (e.g., the display 16 and/or the speaker 22) outputs an evaluation of the musical performance received via the audio input (e.g., the digital connection 24 and/or the microphone 26). The at least one processor 30 executes the musical performance evaluation program 36 to identify errors in the musical performance based the reference data stored in the computer-readable storage medium 32, classify the errors in the musical performance as either a conspicuous error or an inconspicuous error, and instruct the notification device (e.g., the display 16 and/or the speaker 22) to output the evaluation of the musical performance identifying a presence of conspicuous errors differently from inconspicuous errors. Preferably, the at least one processor 30 is configured to instruct the notification device (e.g., the display 16 and/or the speaker 22) to output the evaluation of the musical performance by only identifying the presence of the conspicuous errors.

Now, some examples of reference data that can be used in evaluating a musical performance using the musical performance evaluation system 10 will be described. As mentioned above, the reference data can include MIDI data of a plurality of musical performances and/or synthetic data of a plurality of musical performances with procedurally generated mistakes. In the case of acquiring MIDI data of actual piano performances, for example, three qualitatively different piano playing MIDI data can be acquired to identify errors or mistakes that were made by performers in playing musical performances on a piano. A first set of piano playing MIDI data can include a predetermined number of sight-reading performances by beginning and intermediate adult pianists with formal music training. The first set of piano playing MIDI data is referred to herein as sight-reading data (SR). The performances of the sight-reading data can be comprised of mostly piano reductions of popular classical pieces arranged for beginner to intermediate. A second set of piano playing MIDI data can include a predetermined number of performances by late beginner to early advanced pianists. The second set of piano playing MIDI data is referred to herein as performance data (PF). The performances of the performance data are approximately 3 minutes each, and collected from a digital piano recording app. Not all performed pieces in the performance data are known, but most of them are pop and classical, that are either read from a score, or semi-improvised. While user attributes are unknown in the performance data, the performance data suggests that the skill levels range between late beginner and early advanced. A third set of piano playing MIDI data can include a predetermined number of performances from Bergmüller's 25 Etudes by advanced pianists. The third set of piano playing MIDI data is referred to herein as Bergmüller data (BM). The performances from Bergmüller's 25 Etudes can be recorded twice on a digital piano. The performances from Bergmüller's 25 Etudes are played by an advanced pianist who had previously played the etudes. In the Bergmüller data, the pianist practiced each etude briefly before recording two takes.

For example, a test was performed a piano playing MIDI data including: (1) 103 sight-reading sessions for beginning and intermediate adult pianists with formal music training; (2) 245 performances by late beginner to early advanced pianists on a digital piano, and (3) 50 etude performances by an advanced pianist. The data of this test was annotated at the regions considered to contain conspicuous errors. Then, in this test, the temporal convolutional network 40 was used to detect the sites of such conspicuous errors from a piano roll of a musical performance. Then, the output from the temporal convolutional network 40 for each detected error was then processed using the classifier head 42 to determine the probability of each of the detected errors being a conspicuous error. Finally, a piano roll of the musical performance was displayed identifying only the conspicuous errors in the musical performance.

The total time for the sight-reading data is a first predetermined amount of time. The total time for the performance data is a second predetermined amount of time. The total time for the Bergmüller data is a third predetermined amount of time. The first predetermined amount of time, the second predetermined amount of time and the third predetermined amount of time can be set as needed and/or desired. Non-overlapping splits of the sight-reading data and the performance data are used for training, validation, and testing, whereas the Bergmüller data is kept exclusively for testing. In each set of data conspicuous errors were annotated as conspicuous errors. One example of an annotation procedure will be described herein. Alternative, annotation procedures can be used as needed and/or desired.

In the illustrated example, preferably at least two annotators are used. The first annotator is a person, who is an experienced classical piano teacher. The second annotator is a person, who is training in music production and is also an intermediate level pianist. The first annotator labeled the sight-reading data and the Bergmüller data, while the second annotator labeled the performance data. In each case, the first annotator and the second annotator are to indicate (yes/no) whether they know the piece being performed. For the sight-reading data and the performance data, the first annotator and the second annotator are given instructions to annotate obvious performance mistakes (referred to herein as conspicuous errors) that can be recognized even without checking the score, and it was left up to the first annotator and the second annotator to decide what is a conspicuous error. The annotation of the MIDI data can be done with a music production software such as Cubase. The first annotator and the second annotator are to add an annotation at MIDI note 0 covering a span of a time window which they judge as pertaining to an error.

The Bergmüller data was treated differently because it has been played off of known musical score data. First, the performances were automatically annotated with sites of score deviations using a score alignment system. Then, the first annotator manually reviewed the labels by listening to the performance while looking at the corresponding sheet music, and added missing deviations from the score or removed those which do not reflect errors. The first annotator simultaneously manually labeled each error as conspicuous or not. Although the ratio of annotated regions to total performance time may be small in the Bergmüller data, its annotation approach allows investigation of the relationship between the set of errors obtained by comparing with a score (presumably all errors) to conspicuous errors.

In this methodology, some types of errors may be labeled more consistently than others. The more common errors include insertions and deletions of notes that do not fit in musical context, abrupt pauses, and unstable rhythm coming from hesitations during playing. The common errors will be annotated with reasonable consistency in terms of label location and span when the common errors are relatively short local after which the player recovers into their playing flow. However, more compound deviations were labelled ambiguously. For example, sometimes after an error a player would "sneak-in" some practice before resuming the flow of the piece. In such examples, if the short phrase being practiced sounds out of context, but in itself is coherent, an open question is where the label should be, and whether it should be one continuous label or an intermittent one. Moreover, the presence of unannotated conspicuous mistakes in the data, but there is an inherent ambiguity in how one would assess a "bad but acceptable" and "erroneous performance". If a region contrasts with the annotator's expectation of the music given how that performer is playing, then it will be annotated. This opens the possibility that the annotators have calibrated what should count as a mistake based on individual performance. Silence regions are one of the main sources of ambiguity, since silences between correct portions are unannotated regardless of their length, but silences within or surrounding mistake portions often receive a mistake label.

Since annotating actual musical performances is time consuming and difficult to obtain, two pre-training methods to overcome data scarcity are proposed. The first pre-training method trains a part of the model as an autoencoder, while the second pre-training method uses synthetic data with procedurally generated errors. Experimental evaluation shows that the TCN performs at an F-measure of 78% without pretraining for sight-reading data. However, the proposed pretraining methods improve the F-measure on the performance data and the Bergmüller data to the extent of approaching that of conspicuous error labels by a human annotator.

First, the pre-training method of using an autoencoder 44 will be described. The autoencoder 44 is used to train the feature extractor in an unsupervised manner by using a collection of piano performances. The autoencoder 44 comprises an encoder 46 and a decoder 48. Specifically, in the illustrated example, the feature extraction of the temporal convolutional network 40 is used as the encoder 46, and a temporal convolutional network with transposed **1*d* convolutions instead of a 1d convolution as the decoder 48. MIDI data of musical performances of unknown performance qualities are input into the encoder 46. The encoder 46 then compresses the input (e.g., piano roll MIDI data) and the decoder 48 attempts to recreate the input (e.g., piano roll MIDI data) from the compressed version provided by the encoder 46. After training, the encoder model is saved and the decoder 48 is discarded. The encoder 46 can then be used as a data preparation technique to perform feature extraction on raw data that can be used to train the machine learning model of the temporal convolutional network 40. The encoder 46 learns how to interpret the input and compress it to an internal representation defined by the bottleneck layer. The decoder 48 takes the output of the encoder 46 (the bottleneck layer) and attempts to recreate the input. Once the autoencoder 44 is trained, the decoder 48 is discarded and we only keep the encoder 46** and use it to compress examples of input to vectors output by the bottleneck layer.

In this way, a space of ϕ is pre-trained so as to model the space of piano performances within a given receptive field of the temporal convolutional network 40. This method could be useful if a large data set of performances of unknown performance qualities are obtainable.

Now, the pre-training method of using synthetic data with procedurally generated errors will be described. Here, the machine learning model is pre-trained on performance data onto which errors are simulated and corresponding error labels are inserted to match the expected format of data that would otherwise be obtained using human annotators listening to musical performances and annotating the musical performances. Specifically, systematic adjustments are applied to a set of mistake-free performances and modify the note events in a manner inspired by performance mistakes made by beginning adult pianists. For example, the mistake-free performances can be commercial MIDI piano data containing mostly jazz and classical piano MIDI performances. For each note event with probability $p_c$, we modify the note in one of the following ways:

1. With probability $p_o$ for note omission having a probability $p_o$;
2. With probability $p_r$ for note replacement to the same note transposed n semitones, to simulate hitting the wrong key;
3. With probability $p_r$ for note insertion of a note that is transposed by n semitones;
4. With probability $p_p$ for pause the performance by a small amount distributed uniformly between 0.3 and 0.8 seconds;
5. With probability $p_{pr}$, for repeating the last played note; and
6. With probability $p_s$ for pausing the performance by a large amount distributed uniformly between 2 and 4 seconds.

In this example, the probabilities are set as follows: $p_c$=5%, $p_o$=10%, $p_i$=39%, $p_r$=39%, $p_s$=2%, and $p_p$=10%. Furthermore, for note replacement and insertion, n is chosen so that n=1, 2 are chosen with probabilities of 22% and n=4, 6 by 2%. This method is useful if many performances that are known to be relatively error-free are obtainable. Furthermore, this method can be used for data augmentation, since not all synthetic errors sound conspicuous.

As mentioned above and as seen in FIG. 3, the conspicuous error detector is formed as a simple TCN comprising of a feature extraction backbone followed by a classifier head. In the feature extraction backbone of the temporal convolutional network 40, for a given the piano roll, the feature extraction backbone computes a feature $\phi \in^{RD\times T}$. For this example, the term D=256. This is realized as the temporal convolutional network 40 is preferably a 5-layer noncausal TCN with dilation of [1, 2, 4, 8, 16]. Also, for all layers, the temporal convolutional network 40 has an output channel size of 256, a kernel size of 3, uses ELU nonlinearity and has a residual connection.

As mentioned above and as seen in FIG. 3, the classifier head 42 is a neural network that comprises three layers of 1×1 convolution with output channel sizes [256, 64, 1], with residual connections and ELU nonlinearity followed by a sigmoid function. In this way, the classifier head 42 computes a conspicuous error probability for a given feature d.

In this example of FIG. 3, the machine leaning model was trained using RAdam with a learning rate of $10^{-3}$ as to minimize the cross-entropy between the conspicuous error probability and the posterior distribution computed from the ground-truth label. The reference data is augmented by randomly transposing the entire MIDI file in the training data. Furthermore, the ground-truth label to account for annotation inconsistencies in start and end times of the conspicuous error segment was smoothed when computing the cross-entropy loss. Furthermore, since it is difficult to obtain annotations of conspicuous errors, the machine leaning model is preferably pre-trained as using one of the two pre-trained methods mentioned above.

Also, in this example of FIG. 3, the temporal convolutional network 40 of the machine leaning model is trained with one of the following training methods:

1. Baseline method—The temporal convolutional network 40 of the machine leaning model is trained using the sight-reading data and the performance data.
2. SYNTH method—The temporal convolutional network 40 of the machine leaning model is trained as way as the Baseline method with the inclusion of a subset of the synthetic data used during training and validation.
3. SYNTH (FT) method—The temporal convolutional network 40 of the machine leaning model is pretrained on the synthetic data, then fine-tuned using the sight-reading data and the performance data. This simulates a situation where a new annotated dataset becomes available after training the machine leaning model solely on a synthetic data.
4. AE method—The temporal convolutional network 40 of the machine leaning model is pretrained using the autoencoder 44 as a pretraining step for the backbone TCN, using for example approximately 100,000 MIDI performances played by various users. The set of MIDI performances does not contain the sight-reading data, the performance data or the Bergmüller data. The temporal convolutional network 40 of the machine leaning model is then fine-tuned using the sight-reading data and the performance data.
5. AE+SYNTH method—The temporal convolutional network 40 of the machine leaning model is pretrained using the autoencoder 44 as a pretraining step for the backbone TCN, using for example approximately 100,000 MIDI performances played by various users. The temporal convolutional network 40 of the machine leaning model is then fine-tuned using the sight-reading data, the performance data and the synthetic data.

Each of these training methods were evaluated to create trained machine leaning models. The trained machine leaning models were then validated on the sight-reading data and the performance data, and evaluated on a test split of the sight-reading data and the performance data, and the entire Bergmüller data. As the metric, in these tests, the transcription precision/recall/F1-measure using mir_eval were evaluated, treating the estimated and the ground-truth annotations as note events occurring at a predefine pitch. When computing the transcription metrics, the note onset and offset tolerances were set to 2 seconds. Furthermore, based on the validation set, the ends of the estimated segments have been padded by 0.2 seconds and overlapping segments have been merged. The test results of the trained machine leaning models are set forth in Tables 1, 2 and 3.

TABLE 1

| Sight-Reading (SR) Data | | | |
|---|---|---|---|
| Method | Precision | Recall | F-measure |
| Baseline | 79% | 80% | 78% |
| SYNTH | 65% | 76% | 69% |
| SYNTH(FT) | 61% | 69% | 62% |

TABLE 1-continued

| Sight-Reading (SR) Data | | | |
|---|---|---|---|
| Method | Precision | Recall | F-measure |
| AE | 55% | 59% | 55% |
| AE + SYNTH | 44% | 65% | 51% |

TABLE 2

| Performance (PF) Data | | | |
|---|---|---|---|
| Method | Precision | Recall | F-measure |
| Baseline | 28% | 46% | 33% |
| SYNTH | 27% | 54% | 34% |
| SYNTH(FT) | 30% | 61% | 38% |
| AE | 28% | 52% | 34% |
| AE + SYNTH | 27% | 63% | 36% |

TABLE 3

| Bergmüller (BM) Data | | | |
|---|---|---|---|
| Method | Precision | Recall | F-measure |
| Baseline | 26% | 36% | 26% |
| SYNTH | 26% | 69% | 35% |
| SYNTH(FT) | 26% | 49% | 32% |
| AE | 27% | 46% | 31% |
| AE + SYNTH | 28% | 52% | 35% |

For the performance dataset and the Bergmüller dataset, the augmentation strategies offer some improvements. The two training methods proposed, i.e., the use of synthetic data and the autoencoder 44, also result in improvements. In general, both training methods tend to improve the recall rate, suggesting that they provide similar qualitative improvements, and either one can be used depending on the data available.

As seen in Tables 2 and 3, despite the augmentation strategies, the accuracy scores of the F-measures for the performance data and the Bergmüller data were relatively low, even taking into account the ambiguities of conspicuous errors. In particular, the accuracy scores of the F-measures for the performance data and the Bergmüller data were relatively low as compared to the accuracy scores of the F-measures for the sight-reading data, even taking into account the ambiguities of conspicuous errors. As seen in Tables 2 and 3, the performance data and the Bergmüller data are difficult to infer, as seen by the differences in the F-measure between the sight-reading dataset and the two.

As another example, the validation of the F-measure of the trained machine leaning models on the synthetic dataset is about 60%. This suggests that the model is moderately capable of pinpointing the ground-truth labels if they are easy to classify, or generated stochastically but systematically. At the same time, however, as the best performing F-measure of 38% on the performance dataset, the trained machine leaning model falls short of the target accuracy score of 43% for the F-measure.

The trained machine leaning model for the sight-reading data performs the best. This is likely due to most of the mistakes being quite conspicuous in a sight-reading situation, especially compared to the performance data and the Bergmüller data, both of which contain mostly beginner-intermediate performances with occasional mistakes. The performance of the trained machine leaning model tends to drop as more pretraining steps are added. This is likely to occur because the pretraining data mostly contain data of the same type as the performance dataset, increasing the disparity between the training data and the test data. In sight-reading situations, the results suggest it is sufficient simply to train on a data set that solely contains data from the same set, instead of pretraining or augmenting the dataset with typical amateur performances containing some conspicuous errors.

The above methods used in the leaning model tend to capture repetition, pauses, hesitations, and note insertions that occur in narrow pitch intervals as mistakes. At the same time, however, the very same properties arising from musical expression or composition are detected as false positives, such as repeated motifs, ornaments, and grand pauses. Even though such musical aspects are superficially performed similarly to the aforementioned mistakes, humans are capable of differentiating between genuine performance mistakes and those within musical contexts. Thus, the learning model can be improved by modeling the underlying composition better. Thus to define manifestations of conspicuous errors, a midpoint is preferably found between a rule based approach and one learned from empirical labels. The outcome is preferably a set of error descriptions, some of which happen at particular time instants and some over longer windows, whether continuous windows or a longer span of intermittent labels. However, since the conspicuousness of errors is inspired by a perceptual idea, these errors are preferably defined through an empirical process. Also, synthetic data is helpful for improving performance. However, in certain cases, some synthesized mistakes may sound unnatural. For example, in the case of induced pitch insertions, it may seem to be difficult for someone to be able to perform with such confidence and tempo despite the extent of out-of-context pitch insertions. It has been observed that beginners make errors and employ recovery strategies that are more complex than synthetic data that merely create simple errors such as repetition, pauses, hesitations, and note insertions. Thus, it is desirable to study beginning pianists' behavior to create synthetic data having more natural sounding errors.

Referring to FIG. 4, the temporal convolutional network 40 is configured to receive data representing the musical performance played on a musical instrument that is to be evaluated. For example, the in illustrated embodiment, the temporal convolutional network 40 receives MIDI data from the digital audio workstation 34. Next, the temporal convolutional network 40 is executed by the processor 30 to identify errors in the musical performance using reference data that is stored in the computer-readable storage device 32 or the remote server 28 (e.g., a network server or a cloud server). In other words, in the illustrated example, the temporal convolutional network 40 detects the sites of such errors in the musical performance from the piano roll. The results of the error detection by the temporal convolutional network 40 are then output to the classifier head 42, which then determines if a detected errors is considered to be a conspicuous error or an inconspicuous error. A "conspicuous error" as used herein refers to an error that would be readily recognized by a listener having a prescribed skill level without referring to the musical score or having knowledge of the musical score. The "prescribed skill level" is based on the reference data collected and the skill level of the listener(s) used to determine whether an error is a conspicuous error or an inconspicuous error. As explained below, preferably, the user of the musical performance evaluation system 10 can selectively set aa threshold level that separates the inconspicuous errors from the conspicuous errors. In this way, the user of the musical performance evaluation system 10 can finely adjust the level of errors that are notified to the user.

In particular, here, the digital audio workstation 34 outputs data representing at least one piano roll from the musical performance played on the digital piano 12. Preferably, the digital audio workstation 34 outputs data representing a first piano roll 50 and a second piano roll 52 to the temporal convolutional network 40. In other words, in the illustrated embodiment, two piano rolls are extracted for a given sequence of piano note events in the musical performance. The first piano roll 50 is one for the note onset, while the second piano roll 52 is for the sustained portion according to the key depression. Specifically, suppose a set of/MIDI note events (start time, end time, pitch, velocity) given as $$\{(si, ei, pi, vi)\}_i^I,$$

and a sampling rate of R are given. Then, a 256-dimensional piano roll $X \in R^{256 \times T}$ is computed, such that X(pi, round (Rsi))=vi, and X(128+pi, round (Rs))=vi for s∈[si, ci]. Then for example, a Python package such as Partitura is used for the computation, and R is set to 16 Hz. Partitura can load musical scores (in MEI, MusicXML, Kern, and MIDI formats), MIDI performances, and score-to-performance alignments. The package includes some tools for music analysis, such as automatic pitch spelling, key signature identification, and voice separation. Also, the sustain pedal information is ignored in the computation of the second piano roll 52. It is preferable to ignore the sustain pedal information to prevent the second piano roll 52 of the sustained portion from smearing since a beginning pianist has a tendency to keep the pedal depressed which causes an excessive elongation of the computed note durations.

Referring to FIG. 5, a flowchart illustrates an evaluation process executed by a computing device 14 of the musical performance evaluation system 10 using the temporal convolutional network 40 and the classifier head 42. Here, in this example, the musical instrument is the digital piano 12, and the computing device 14 includes the software for the digital audio workstation 34 and the musical performance evaluation program 36.

Basically, evaluation process of the flowchart in FIG. 5 represents a computer-implemented musical performance evaluation method that comprises acquiring a musical performance of an instrument played by a user; identifying errors in the musical performance based reference data stored in the computer-readable storage medium 32 using the at least one processor 30; classifying the errors in the musical performance as either a conspicuous error or an inconspicuous error using the at least one processor 30; and instructing a notification device (e.g., the display 16 and/or the speaker 22) to output an evaluation of the musical performance by identifying a presence of conspicuous errors differently from inconspicuous errors.

Still referring to FIG. 5, in the evaluation process, the user will start the digital audio workstation 34 installed on the computing device 14 and select "record" to start recording a musical performance. Thus, in step S1 of the evaluation process, the processor 30 acquires at least part of the musical performance that is being received via an audio input such as the communication cable 24 (digital connection) or the microphone 26. Preferably, the evaluation process is performed by evaluating sequential segments of a performance.

Then in step S2 of the evaluation process, the processor 30 creates musical performance data that is indicative of the notes played by the instrument. Here, the processor 30 computes the first piano roll 50 and the second piano roll 52, which were mentioned above. Of course, the processor 30 creates the musical performance data in other formats as needed and/or desired. Here, the processor 30 computes the first piano roll 50 and the second piano roll 52 using the digital audio workstation 34.

Next, in step S3 of the evaluation process, the processor 30 identifies any errors in the musical performance using the temporal convolutional network 40. Basically, the temporal convolutional network 40 compares the musical performance data (e.g., the first piano roll 50 and the second piano roll 52) against the reference data stored in the computer-readable storage device 32 or the remote server 28 (e.g., a network server or a cloud server). In this way, the errors in the musical performance are identified.

Next, in step S4 of the evaluation process, the processor 30 determines if there are any conspicuous errors in the musical performance using the classifier head 42. More specifically, the errors in the musical performance that are identified by the temporal convolutional network 40 are inputted to the classifier head 42. The classifier head 42 then determines a conspicuous error probability for each error using the reference data. Then, the conspicuous error probability for each error is compared to a conspicuous error threshold value for classifying for each error as either a conspicuous or an inconspicuous. In other words, if the conspicuous error probability is equal to or above the conspicuous error threshold value, then the error is determined to be a conspicuous error. On the other hand, if the conspicuous error probability is below the conspicuous error threshold value, then the error is determined to be an inconspicuous error. The conspicuous error threshold value can be a single value for all types of errors or can be a different value for different types of error. For example, in the case where the classifier head 42 determines the conspicuous error probability is 50% for a particular error and the conspicuous error threshold value is set to 39% for that type of error, then the error is determined to be a conspicuous error.

Next, in step S5 of the evaluation process, the processor 30 outputs a notification of the conspicuous error, if any, in the musical performance. The notification for each segment of the musical performance can be output in real time (or nearly real time) or can be stored for output at a later time. The notification from the processor 30 can be conveyed to the performer using a notification device such as the display 16 and the external speaker 22.

After step S5 of the evaluation process, the processor 30 returns to step S1 to repeat the evaluation process on the next segment of the musical performance. The musical performance is stopped one the performer or another person stop the recording of the musical performance.

Figure 7:
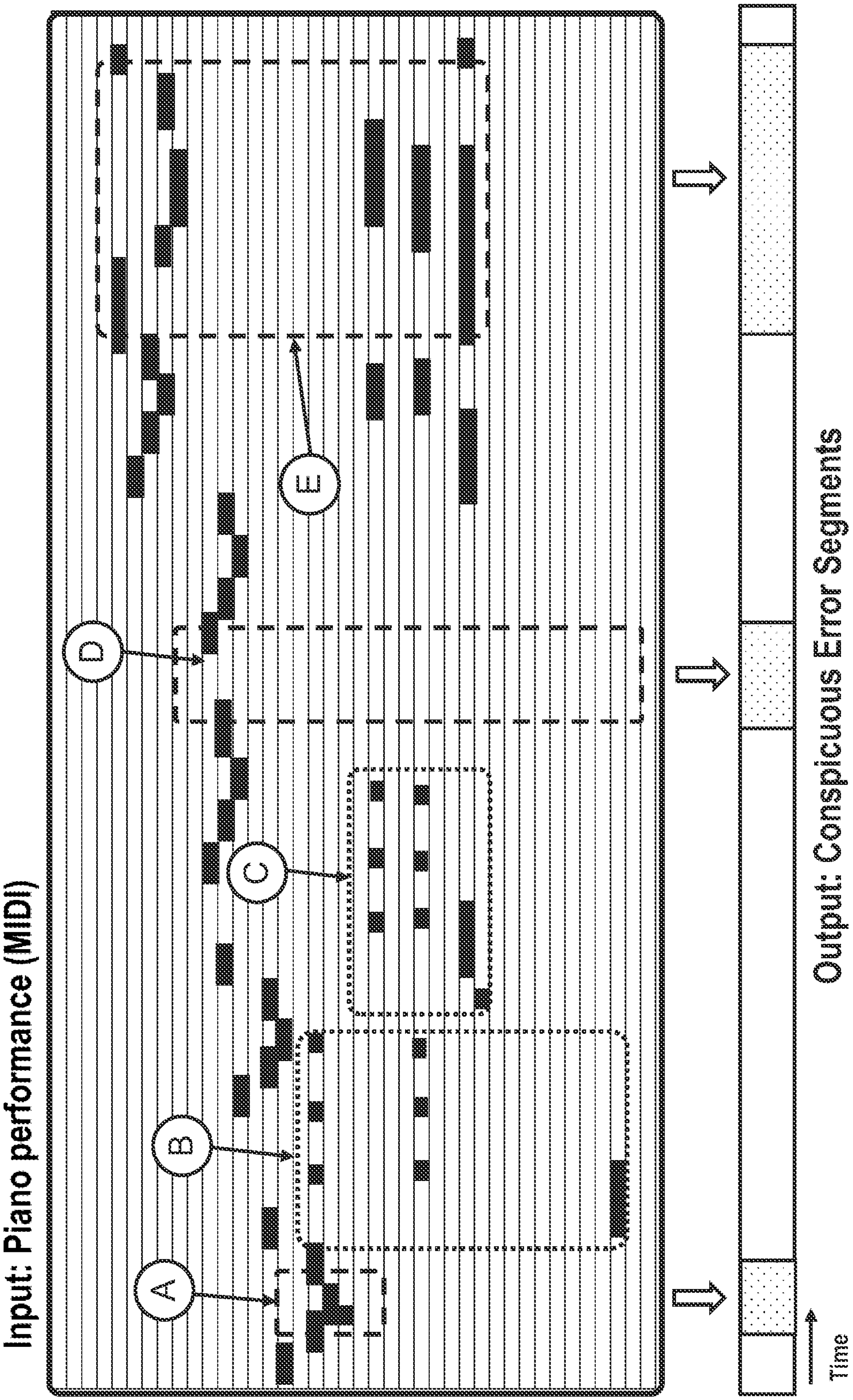
FIG. 7 is a diagrammatic illustration of a piano roll created based on a musical performance and identification of the errors in the musical performance using the musical performance evaluation system.

Once the first piano roll 50 and the second piano roll 52 for a given sequence of piano note events in the musical performance are inputted in the temporal convolutional network 40, the presence of errors are detected in the musical performance by comparing the first piano roll 50 and the second piano roll 52 against the reference data that has been pretrained and implemented into the temporal convolutional network 40 and the classifier head 42. FIG. 7 shows an example of a piano roll 54 computed from a musical performance that is inputted to the temporal convolutional network 40 from the digital audio workstation 34. In this exemplary piano roll 54 of FIG. 7, the musical performance includes several errors or mistakes by the performer of the musical performance. Here, five errors are identified in the exemplary piano roll 54 as error "A", error "B", error "C", error "D", and error "E" by the temporal convolutional network 40.

Figure 8:
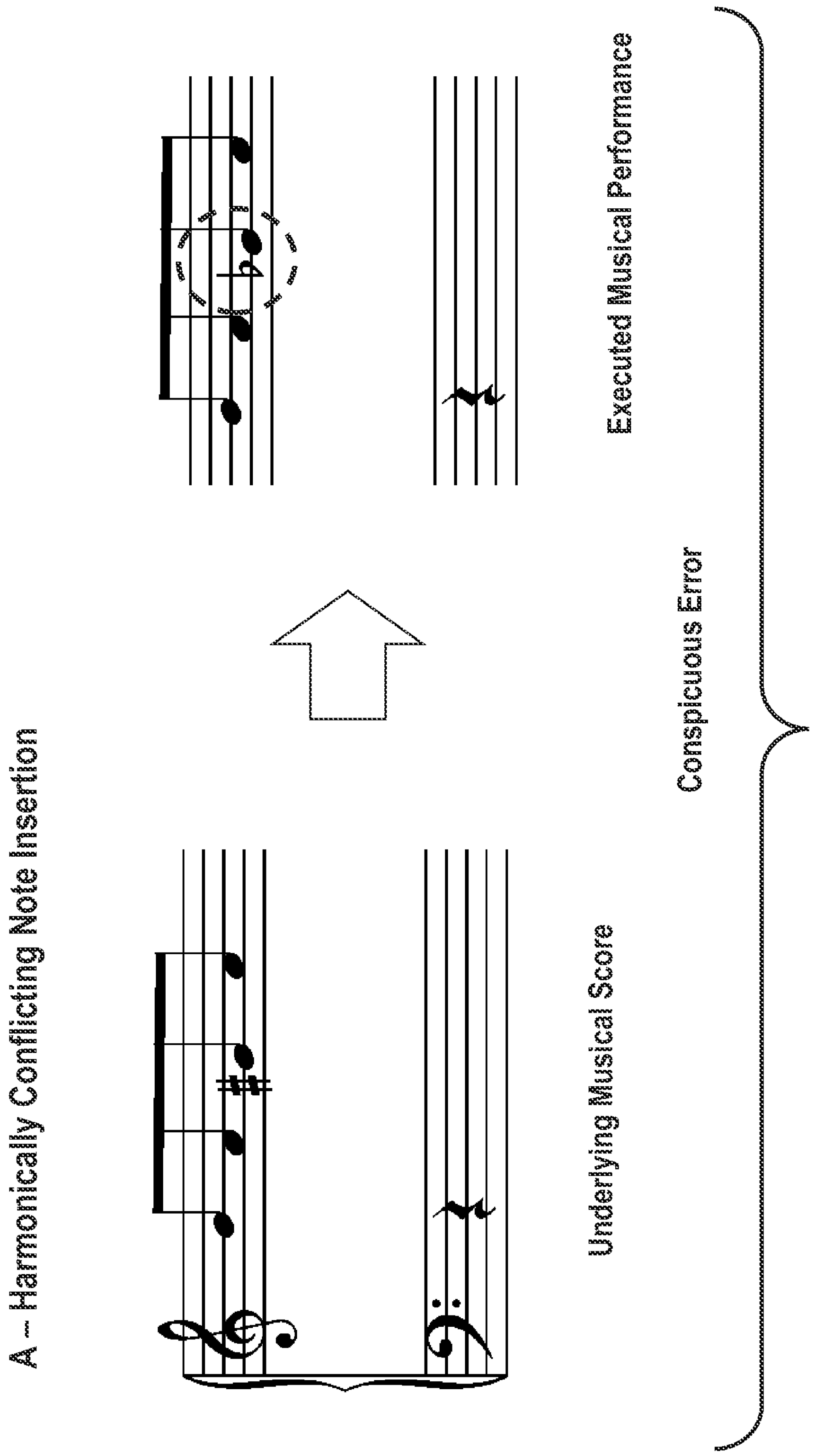
FIG. 8 is a diagrammatic illustration of a segment of the sheet music corresponding to the error "A" of FIG. 7 that has been identified by the musical performance evaluation system as containing at least one conspicuous error.

Referring to FIG. 8, the error "A" is identified in the exemplary piano roll 54 as a harmonically conflicting note insertion error, which the temporal convolutional network 40 and the classifier head 42 identifies as conspicuous error. Namely, the temporal convolutional network 40 computes the underlying musical score for the musical performance to be the musical score shown on the left in FIG. 8, and thus, identifies the error (circled in dashed lines) in the executed musical performance shown on the right in FIG. 8. The classifier head 42 then determines the probability of the detected error being a conspicuous error based on the prestored conspicuous error threshold for a note insertion error.

Figure 9:
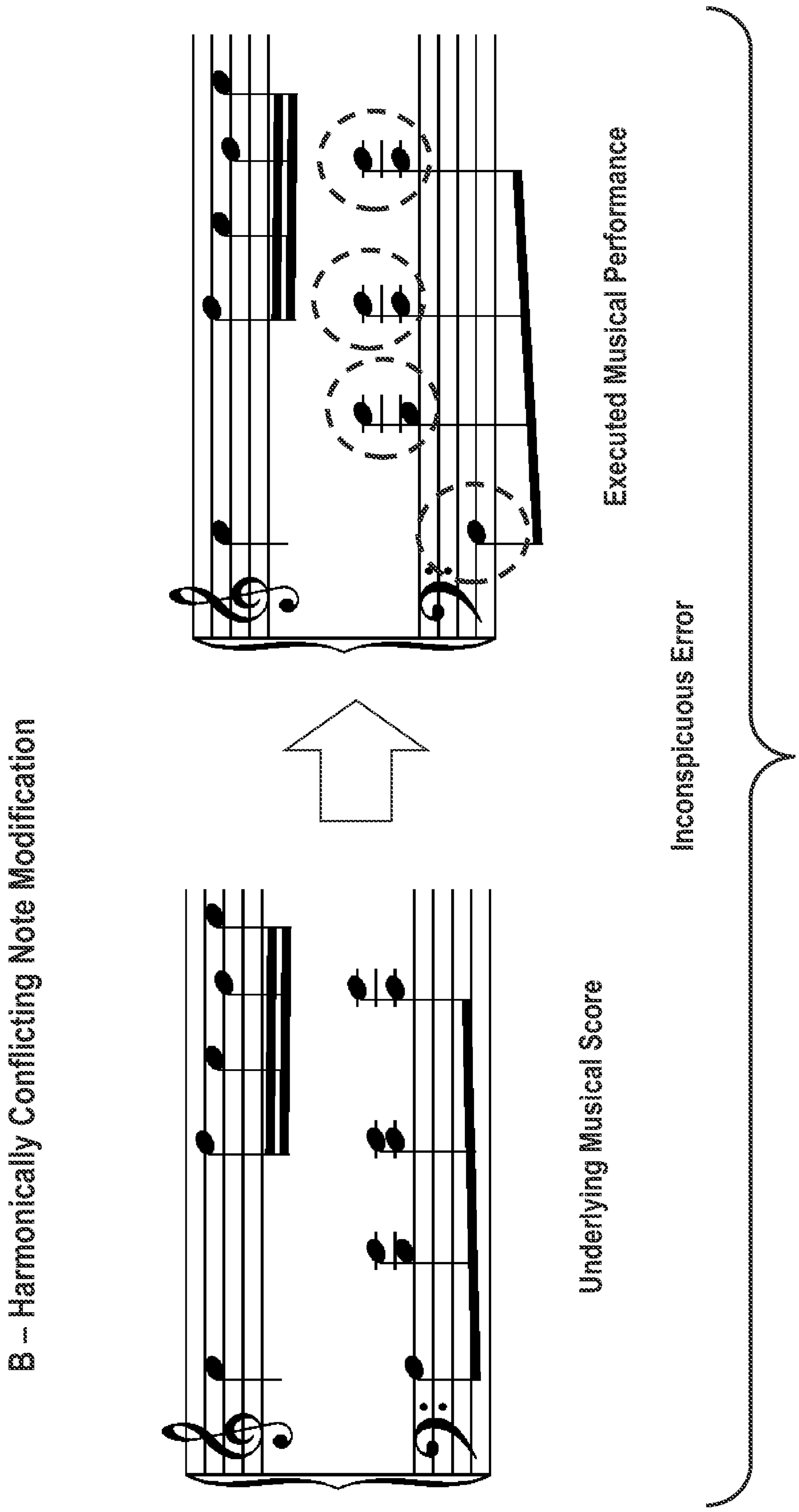
FIG. 9 is a diagrammatic illustration of a segment of the sheet music corresponding to the error "B" of FIG. 7 that has been identified by the musical performance evaluation system as containing at least one inconspicuous error.

Referring to FIG. 9, the error "B" is identified in the exemplary piano roll 54 as a harmonically conflicting note modification error, which the temporal convolutional network 40 and the classifier head 42 identifies as inconspicuous error. Namely, the temporal convolutional network 40 computes the underlying musical score for the musical performance to be the musical score shown on the left in FIG. 9, and thus, identifies the errors (circled in dashed lines) in the executed musical performance shown on the right in FIG. 9. The classifier head 42 then determines the probability of the detected errors being inconspicuous errors based on the prestored conspicuous error threshold for a note modification error.

Figure 10:
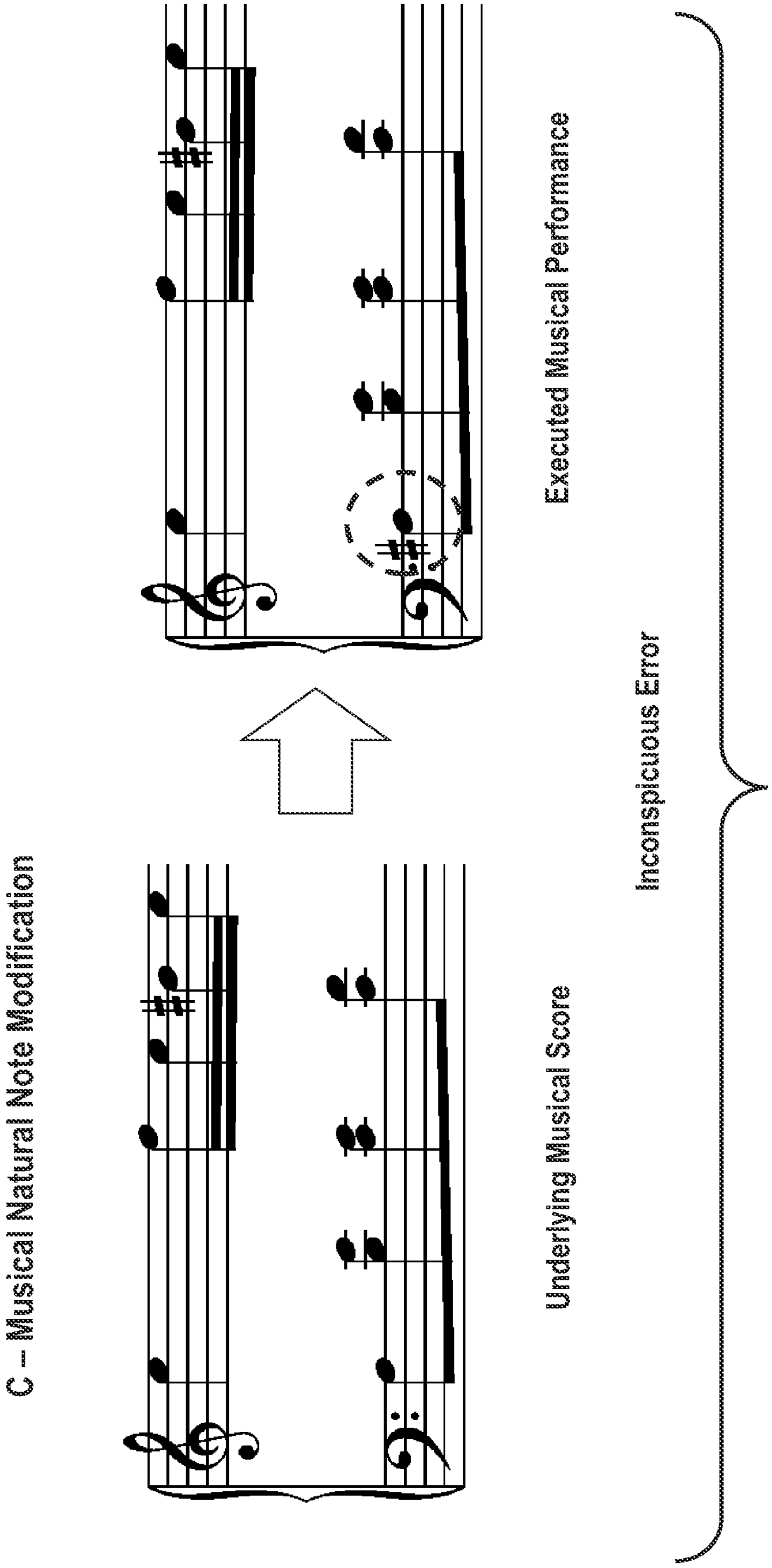
FIG. 10 is a diagrammatic illustration of a segment of the sheet music corresponding to the error "C" of FIG. 7 that has been identified by the musical performance evaluation system as containing at least one inconspicuous error.

Referring to FIG. 10, the error "C" is identified in the exemplary piano roll 54 as a musical natural note modification error, which the temporal convolutional network 40 and the classifier head 42 identifies as inconspicuous error. Namely, the temporal convolutional network 40 computes the underlying musical score for the musical performance to be the musical score shown on the left in FIG. 10, and thus, identifies the error (circled in dashed lines) in the executed musical performance shown on the right in FIG. 10. The classifier head 42 then determines the probability of the detected error being inconspicuous errors based on the prestored conspicuous error threshold for a note modification error.

Figure 11:
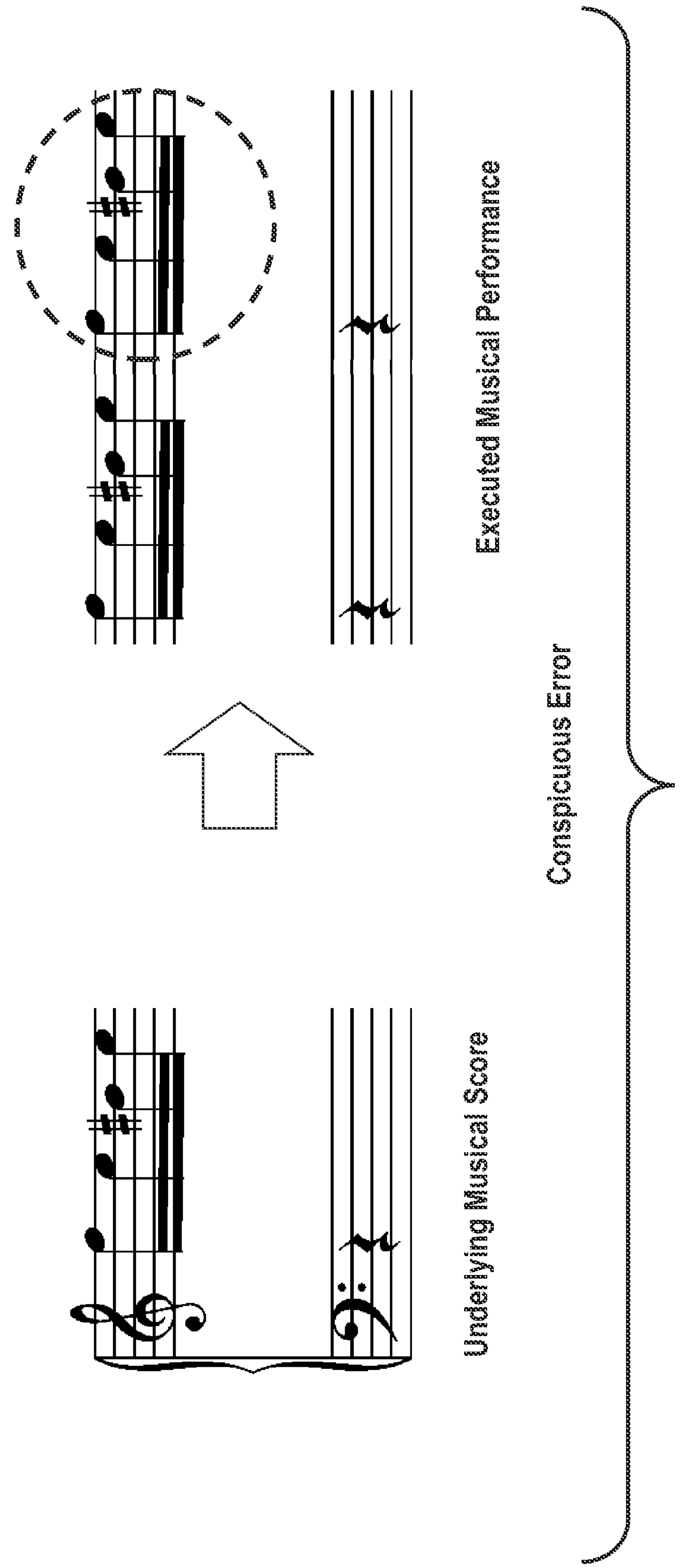
FIG. 11 is a diagrammatic illustration of a segment of the sheet music corresponding to the error "D" of FIG. 7 that has been identified by the musical performance evaluation system as containing at least one conspicuous error.

Referring to FIG. 11, the error "D" is identified in the exemplary piano roll 54 as an abrupt pause or repetition error, which the temporal convolutional network 40 and the classifier head 42 identifies as conspicuous error. Namely, the temporal convolutional network 40 computes the underlying musical score for the musical performance to be the musical score shown on the left in FIG. 11, and thus, identifies the error (circled in dashed lines) in the executed musical performance shown on the right in FIG. 11. The classifier head 42 then determines the probability of the detected error being a conspicuous error based on the prestored conspicuous error threshold for an abrupt pause or repetition error.

Figure 12:
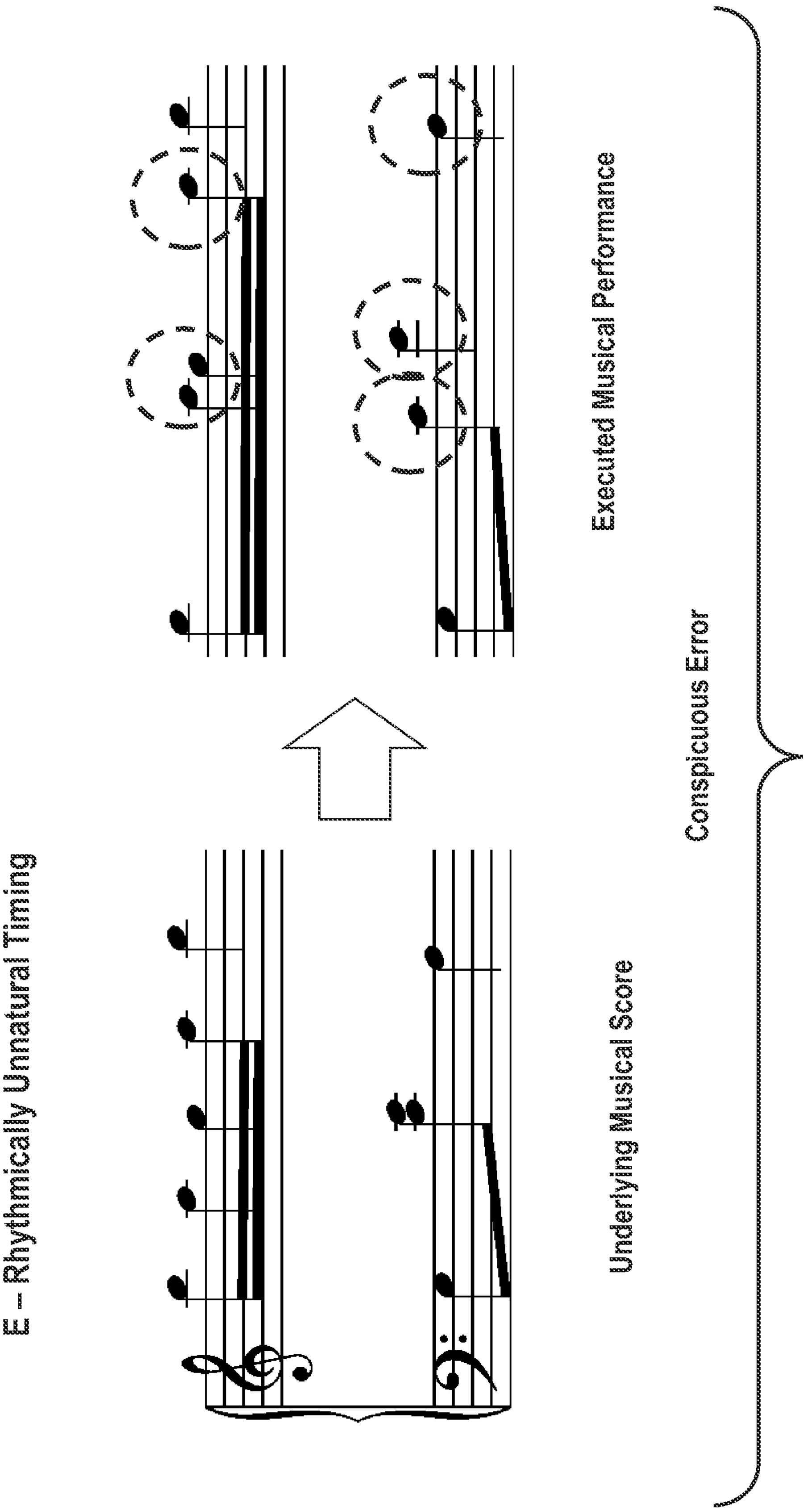
FIG. 12 is a diagrammatic illustration of a segment of the sheet music corresponding to the error "E" of FIG. 7 that has been identified by the musical performance evaluation system as containing at least one conspicuous error.

Referring to FIG. 12, the error "E" is identified in the exemplary piano roll 54 as a rhythmically unnatural timing error, which the temporal convolutional network 40 and the classifier head 42 identifies as conspicuous error. Namely, the temporal convolutional network 40 computes the underlying musical score for the musical performance to be the musical score shown on the left in FIG. 12, and thus, identifies the error (circled in dashed lines) in the executed musical performance shown on the right in FIG. 12. The classifier head 42 then determines the probability of the detected error being a conspicuous error based on the prestored conspicuous error threshold for a timing error.

Figure 13:
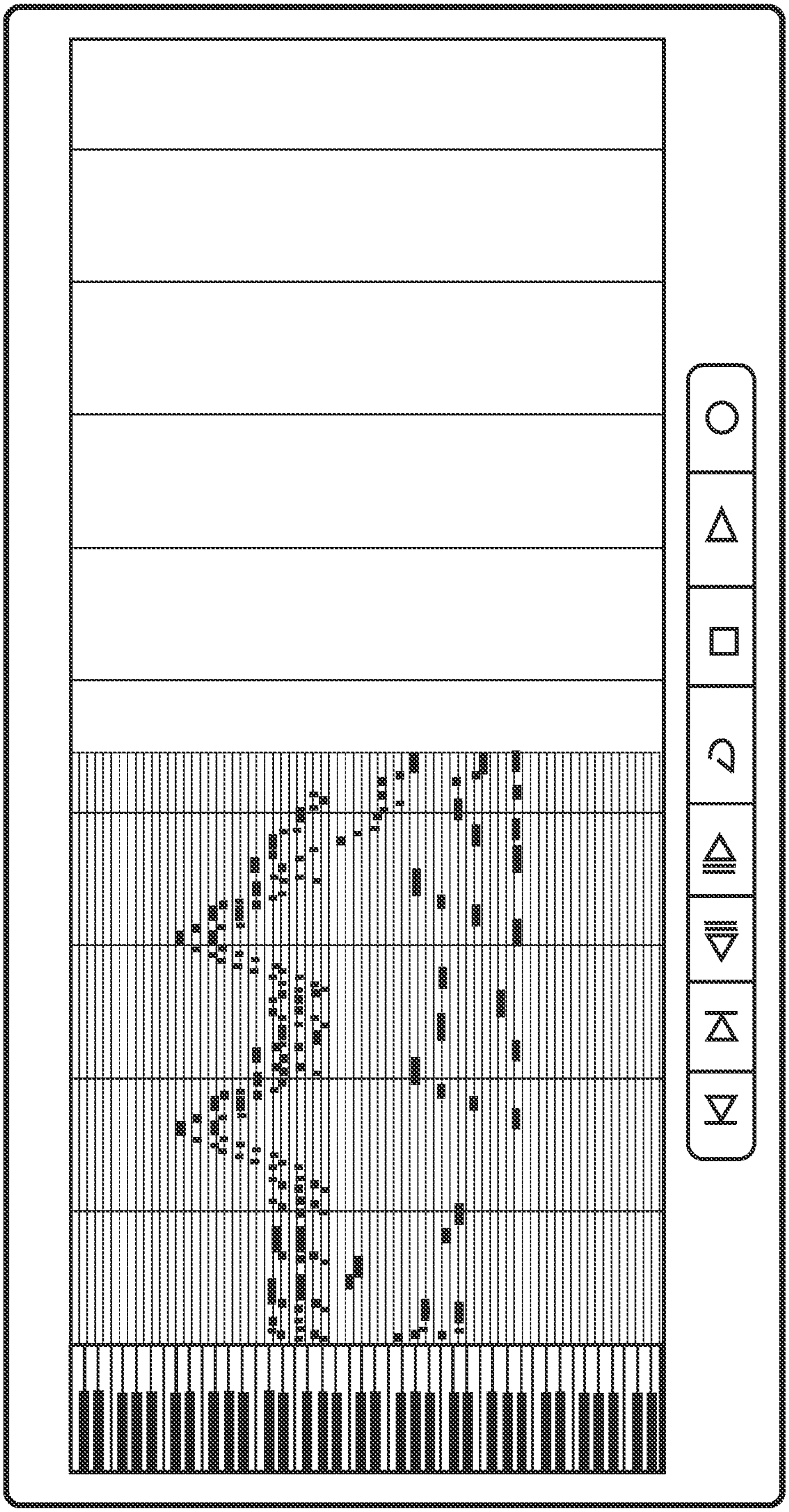
FIG. 13 is a diagrammatic illustration of a recording screen of a digital audio workstation (DAW) that is used to record a musical performance and to create a piano roll of the musical performance.
Figure 14:
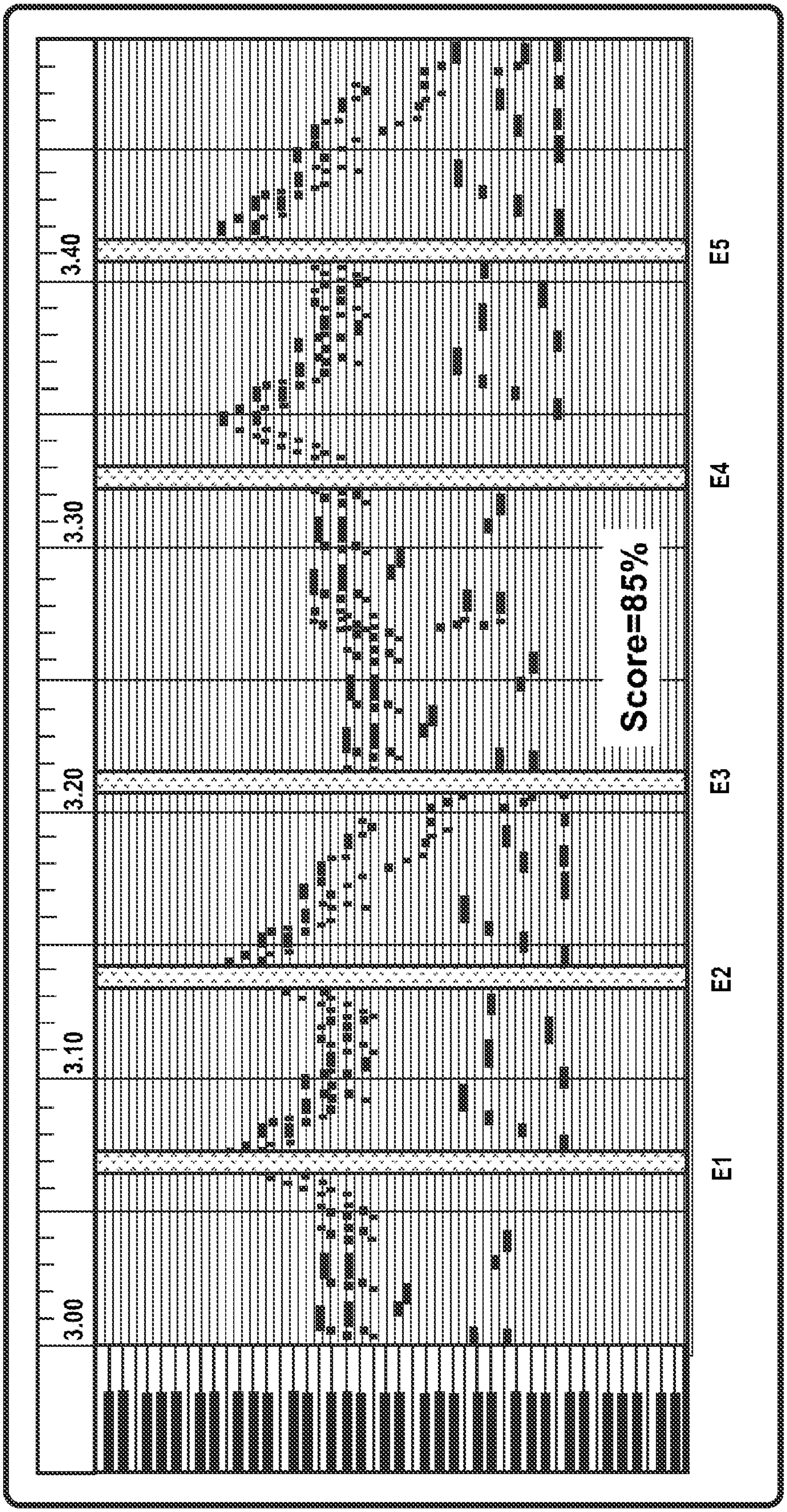
FIG. 14 is a diagrammatic illustration of a recording review screen of the digital audio workstation in which the recorded musical performance has been evaluated using the musical performance evaluation system for identifying the presence of conspicuous errors.

Referring now to FIGS. 13 and 14, a first notification method of the musical performance evaluation system 10 will now be described. In the first notification method, the notification device includes the display 16 that presents the evaluation of the musical performance. Here, the user will start the digital audio workstation 34 installed on the computing device 14 and select "record" to start recording a musical performance. Thus, the processor 30 starts acquiring the musical performance that is being received via an audio input such as the communication cable 24 (digital connection) or the microphone 26. The at least one processor 30 is configured to presents a piano roll of the musical performance on the display 16 identifying the presence of the conspicuous errors differently from the inconspicuous errors. In particular, as the musical performance is being recorded, the at least one processor 30 using the digital audio workstation 34 creates a piano roll of the musical performance that is displayed on the screen of the display 16 as illustrated in FIG. 13. In the background, the at least one processor 30 using the musical performance evaluation program 36 receives the piano MIDI roll to identify in the presence conspicuous errors in the musical performance. Preferably, the evaluation process is performed by evaluating sequential segments of a musical performance. Alternatively, in this notification method, the evaluation process can be delayed until the user stops the recording of the musical performance or inputs a command to generate an evaluation of the musical performance. In any case, once the user stops the recording of the musical performance, the musical performance evaluation program 36 generate an evaluation of the musical performance either automatically or in response to a command input by the user to generate an evaluation of the musical performance.

One example of the evaluation of the musical performance is illustrated in FIG. 14. As seen in FIG. 14, the screen of the display 16 displays a piano roll with the conspicuous errors being identified in the musical performance. In particular, the at least one processor 30 is configured to presents only the conspicuous errors on the piano roll presented by the display 16 in this first notification method. Here, as seen in FIG. 14, for example, vertical lines are superimposed on the piano roll displayed on the screen of the display 16 to indicate the conspicuous errors. The inconspicuous errors are not identified in this first notification method. It will be apparent from this disclosure that the conspicuous errors can be identified in other ways on the piano roll such as with callouts that describe the error. Moreover, the notification can be other types of visual indictors that do not include a piano roll. Also, if desired, the user can input a command to display all errors (inconspicuous errors and conspicuous errors) in the recorded musical performance.

Figure 16:
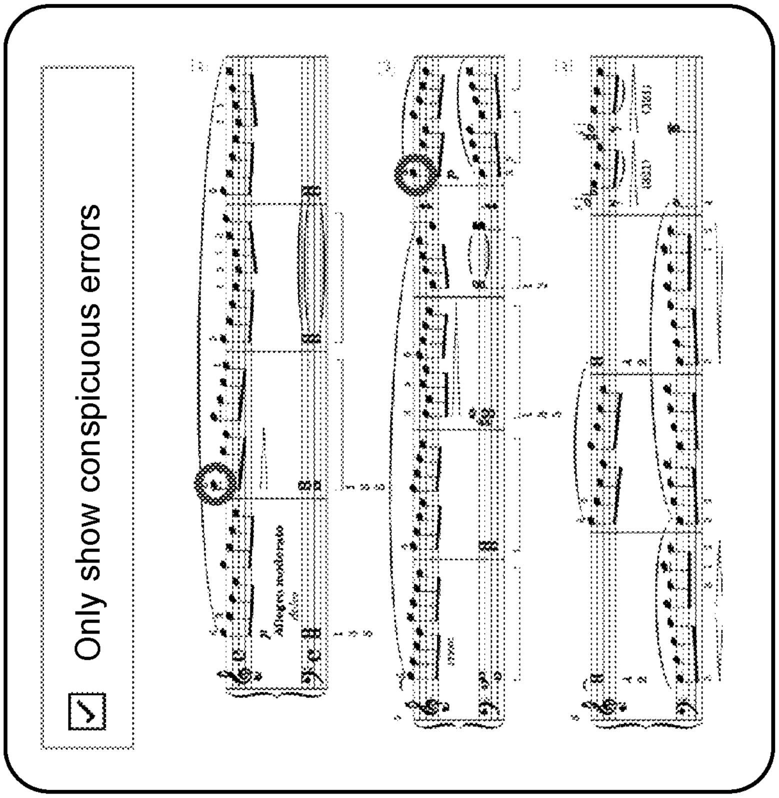
FIG. 16 is a diagrammatic illustration of an output screen of the digital audio workstation showing a recorded musical performance where the presence of only conspicuous errors are identified in the recorded musical performance.
Figure 15:
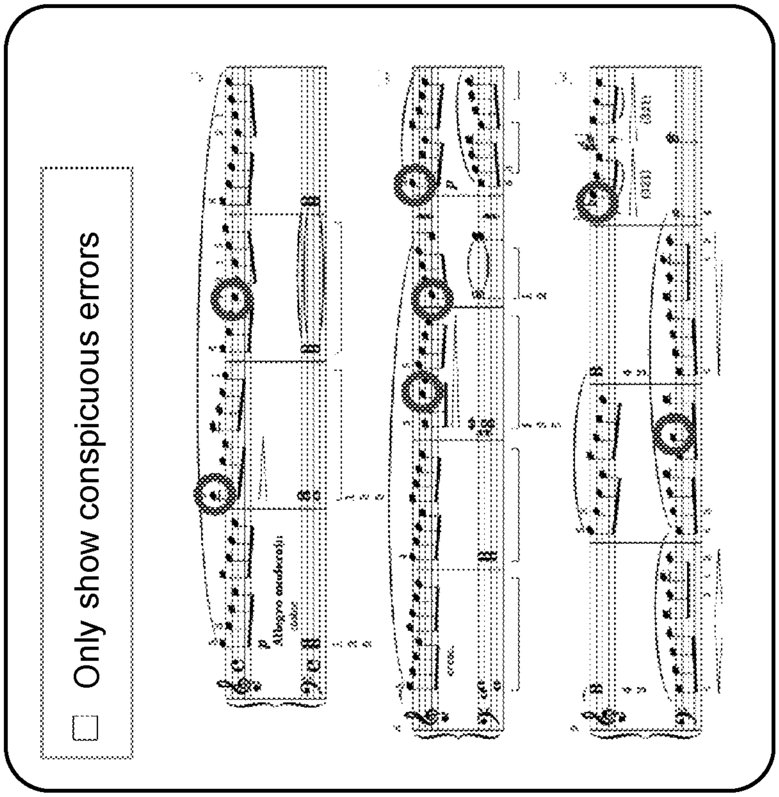
FIG. 15 is a diagrammatic illustration of an output screen of the digital audio workstation showing a recorded musical performance where the presence of both conspicuous errors and inconspicuous errors are identified in the recorded musical performance.
Figure 17:
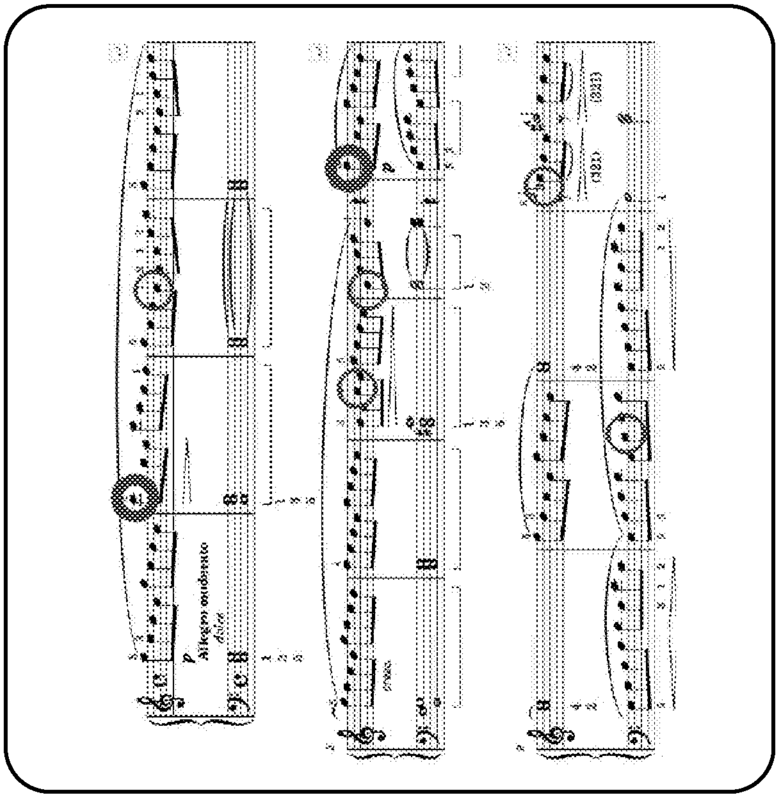
FIG. 17 is a diagrammatic illustration of an output screen of the digital audio workstation showing a recorded musical performance where the presence of both conspicuous errors and inconspicuous errors are identified in the recorded musical performance, but the conspicuous errors are emphasized over the inconspicuous errors.

Referring now to FIGS. 15 to 17, a second notification method of the musical performance evaluation system 10 will now be described. In the second notification method, the notification device includes the display 16 that presents the evaluation of the musical performance. Here, similar to the first notification method, the user will start the digital audio workstation 34 installed on the computing device 14 and select "record" to start recording a musical performance. Thus, similar to the first notification method, the processor 30 starts acquiring the musical performance and the digital audio workstation 34 creates a piano roll of the musical performance that is displayed on the screen of the display 16 such as illustrated in FIG. 13. However, in the second notification method, the piano roll is not used to indicate the conspicuous errors. Rather, the digital audio workstation 34 creates a music score of the musical performance that is displayed on the screen of the display 16 as illustrated in FIG. 15. The at least one processor 30 is configured to present a musical score of the musical performance on the display 16 identifying the presence of the conspicuous errors differently from the inconspicuous errors on the musical score. In other words, the at least one processor 30 using the musical performance evaluation program 36 identifies the presence conspicuous errors in the musical performance. Here, the user can select how the errors are displayed on the displayed music score. The user can select to display all errors (inconspicuous errors and conspicuous errors) in the recorded musical performance as seen in FIG. 15, or can select to display only conspicuous errors in the recorded musical performance as seen in FIG. 16. Moreover, the user can select to display all errors in a manner that conspicuous errors are distinguishable from the inconspicuous errors as seen in FIG. 17. Thus, in the second notification method, the at least one processor 30 is configured to present a musical score of the musical performance on the display 16 identifying the presence of the conspicuous errors differently from the inconspicuous errors on the musical score as well as configured to present only the conspicuous errors on the musical score presented by the display 16.

Figure 18:
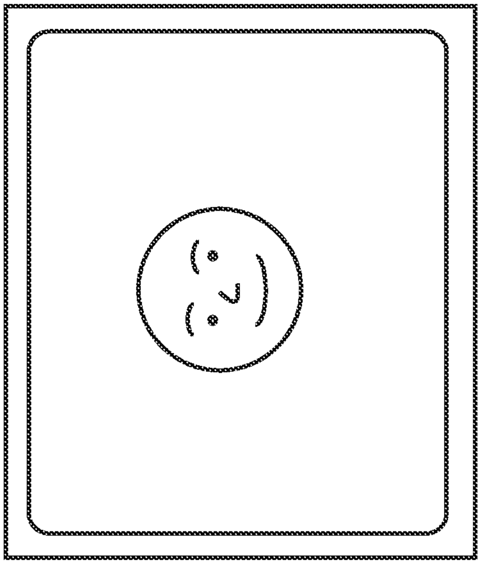
FIG. 18 is a diagrammatic illustration of an output screen of the digital audio workstation showing a virtual listener avatar's evaluation of a segment of a musical performance in which no conspicuous errors are present.
Figure 19:
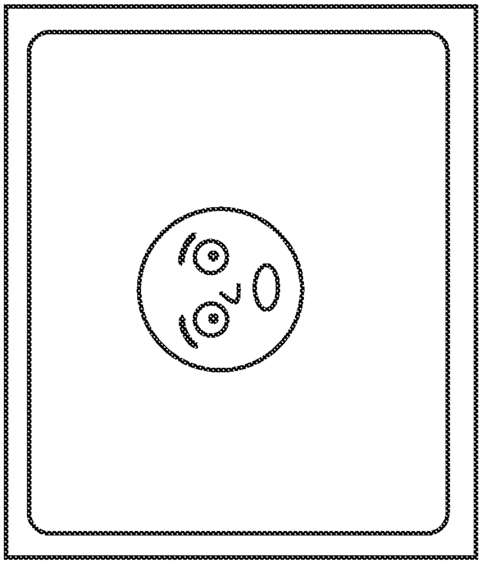
FIG. 19 is a diagrammatic illustration of an output screen of the digital audio workstation showing the virtual listener avatar's evaluation of a segment of a musical performance upon identifying the presence of at least one conspicuous error in the segment of the musical performance.

Referring now to FIGS. 18 and 19, a third notification method of the musical performance evaluation system 10 will now be described. In the third notification method, the notification device includes the display 16 that presents the evaluation of the musical performance. However, the speaker 22 can also be used as the notification device in the third notification method. Here, similar to the first notification method, the user will start the digital audio workstation 34 installed on the computing device 14 and select "record" to start recording a musical performance. Thus, similar to the first notification method, the processor 30 starts acquiring the musical performance and starts evaluating the musical performance for errors. However, here, the notification of the conspicuous errors are provided to the performer on a real time basis or on a nearly real time basis. In other words, the at least one processor 30 is configured to present the conspicuous errors on the display 16 as the musical performance is being acquired by the audio input (e.g., the digital connection 24 or the microphone 26). For example, a virtual listener avatar is displayed on the screen of the display 16 while the musical performance is being performed. This virtual listener avatar acts as a notification of the conspicuous errors. Thus, the at least one processor 30 is configured to present a virtual listener avatar on the display 26 identifying the presence of the conspicuous errors using the virtual listener avatar as the musical performance is being acquired by the audio input (e.g., the digital connection 24 or the microphone 26). Specifically, the at least one processor 30 is configured to change the virtual listener avatar from a first image to a second image to identify the presence of the conspicuous errors where the first image indicates no conspicuous errors at that point in the musical performance and the second image indicates the conspicuous error at that point in the musical performance. More specifically, the expression of the virtual listener avatar changes from a first facial expression (i.e., a first notification) to a second facial expression (i.e., a second notification) when a conspicuous error is identified in the musical performance. For example, the first facial expression (i.e., the first notification) of the virtual listener avatar can be a happy, neutral or indifferent expression to indicate the absence of a conspicuous error, and the second facial expression (i.e., the second notification) of the virtual listener avatar can be a surprised expression to indicate the presence of a conspicuous error. Again, if the user wants to also be notified of inconspicuous errors in the musical performance, then the musical performance evaluation program 36 can identify the presence inconspicuous errors in the musical performance with an expression of the virtual listener avatar that differs from the second facial expression of the virtual listener avatar. In other words, the facial expression of the virtual listener avatar changes from the first facial expression to a third facial expression (i.e., a third notification) that differs from both the first facial expression and the second expression of the virtual listener avatar. For example, the third facial expression of the virtual listener avatar can be a confused expression to indicate the presence of an inconspicuous error.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A musical performance evaluation system comprising:

an audio input configured to receive musical performance data of a musical performance;

a notification device configured to output an evaluation of the musical performance; and at least one processor operatively coupled to the notification device, the at least one processor is configured to execute an application program that records the musical performance data and provide MIDI note events of the musical performance data, the at least one processor being further configured to execute a musical performance evaluation program using the MIDI note events of the musical performance data as inputs to the at least one processor to:

identify errors in the musical performance based on reference data of segments of unrelated musical performances containing errors, the unrelated musical performances being unrelated to the musical performance being evaluated, classify each of the errors in the musical performance as either a first error classification or a second error classification based on the errors in the unrelated musical performances of the reference data where the first error classification is different from the second error classification, and instruct the notification device to output the evaluation of the musical performance based on the errors in the unrelated musical performances of the reference data by identifying a presence of errors of the first error classification in the musical performance differently from errors of the second error classification in the musical performance.

2. The musical performance evaluation system according to claim 1, wherein the at least one processor is configured to instruct the notification device to output the evaluation of the musical performance by only identifying the presence of the errors of the first error classification occurring in the musical performance.

3. The musical performance evaluation system according to claim 1, wherein the application program includes a digital audio workstation that records the musical performance data and provides the MIDI note events of the musical performance data as the input to the at least one processor.

4. The musical performance evaluation system according to claim 3, wherein the MIDI note events of the musical performance includes a start time, an end time, a pitch and a velocity for each of the note events of the musical performance data.

5. The musical performance evaluation system according to claim 4, wherein the digital audio workstation creates at least one piano roll of the musical performance as the input to the at least one processor.

6. The musical performance evaluation system according to claim 5, wherein the at least one piano roll of the musical performance includes a first piano roll providing data on note onsets of the musical performance and a second piano roll providing data on sustained portions due to key depression of the musical performance.

7. The musical performance evaluation system according to claim 1, wherein the at least one processor is configured to classify the errors in the musical performance using a learning model of the musical performance evaluation program.

8. The musical performance evaluation system according to claim 7, wherein the learning model includes a temporal convolutional network.

9. The musical performance evaluation system according to claim 8, wherein the learning model further includes a classifier head provided after the temporal convolutional network.

10. The musical performance evaluation system according to claim 1, wherein the notification device includes a display that presents the evaluation of the musical performance.

11. The musical performance evaluation system according to claim 10, wherein the at least one processor is configured to presents a piano roll of the musical performance on the display identifying the presence of the errors of the first error classification differently from the errors of the second error classification.

12. The musical performance evaluation system according to claim 11, wherein the at least one processor is configured to presents only the errors of the first error classification on the piano roll presented by the display.

13. The musical performance evaluation system according to claim 10, wherein the at least one processor is configured to present a musical score of the musical performance on the display identifying the presence of the errors of the first error classification differently from the errors of the second error classification on the musical score.

14. The musical performance evaluation system according to claim 13, wherein the at least one processor is configured to present only the errors of the first error classification occurring in the musical performance on the musical score presented by the display.

15. The musical performance evaluation system according to claim 10, wherein the at least one processor is configured to present the errors of the first error classification occurring in the musical performance on the display as the musical performance is being acquired by the audio input.

16. The musical performance evaluation system according to claim 15, wherein the at least one processor is configured to present a virtual listener avatar on the display identifying the presence of the errors of the first error classification occurring in the musical performance using the virtual listener avatar as the musical performance is being acquired by the audio input.

17. The musical performance evaluation system according to claim 16, wherein the at least one processor is configured to change the virtual listener avatar from a first image to a second image to identify the presence of the errors of the first error classification occurring in the musical performance where the first image indicates no errors of the first error classification occurring in the musical performance at that point in the musical performance and the second image indicates the error of the first error classification occurring in the musical performance at that point in the musical performance.

18. The musical performance evaluation system according to claim 17, wherein the first image of the virtual listener avatar is a first facial expression and the second image of the virtual listener avatar is a second facial expression.

19. A computer-implemented musical performance evaluation method comprising:

acquiring musical performance data of a musical performance played by a user;

executing an application program using at least one processor to record the musical performance data and provide MIDI note events of the musical performance data:

executing a musical performance evaluation program using the MIDI note events of the musical performance data as inputs to the at least one processor;

identifying errors in the musical performance based on reference data of segments of unrelated musical performances containing errors using the at least one processor where the unrelated musical performances are unrelated to the musical performance being evaluated;

classifying each of the errors in the musical performance as either a first error classification or a second error classification based on the errors in the unrelated musical performances of the reference data using the at least one processor where the first error classification is different from the second error classification; and instructing a notification device to output an evaluation of the musical performance based on the errors in the unrelated musical performances of the reference data by identifying a presence of errors of the first error classification in the musical performance differently from errors of the second error classification in the musical performance.

20. A non-transitory computer-readable medium that stores a musical performance evaluation program, which when executed by a computing device causes the computing device to perform operations comprising:

acquiring MIDI note events from musical performance data of a recording of a musical performance of played by a user using at least one processor of the computing device where the unrelated musical performances are unrelated to the musical performance being evaluated;

identifying errors in the musical performance based on reference data of segments of unrelated musical performances containing errors using the at least one processor of the computing device;

classifying each of the errors in the musical performance as either a first error classification or a second error classification based on the errors in the unrelated musical performances of the reference data using the at least one processor of the computing device where the first error classification is different from the second error classification; and instructing a notification device to output an evaluation of the musical performance based on the errors in the unrelated musical performances of the reference data by identifying a presence of errors of the first error classification in the musical performance differently from errors of the second error classification in the musical performance.

* * * * *